(12) United States Patent
Lin et al.

(10) Patent No.: US 11,582,733 B2
(45) Date of Patent: Feb. 14, 2023

(54) METHOD AND APPARATUS FOR SS/PBCH BLOCK REPETITION

(71) Applicant: Samsung Electronics Co., Ltd., Suwon-si (KR)

(72) Inventors: Qiongjie Lin, Sunnyvale, CA (US); Hongbo Si, Plano, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 16/946,110

(22) Filed: Jun. 5, 2020

(65) Prior Publication Data

US 2020/0404601 A1 Dec. 24, 2020

Related U.S. Application Data

(60) Provisional application No. 62/863,481, filed on Jun. 19, 2019, provisional application No. 62/870,379, filed on Jul. 3, 2019.

(51) Int. Cl.
*H04W 72/04* (2009.01)
*H04W 56/00* (2009.01)
(Continued)

(52) U.S. Cl.
CPC ......... *H04W 72/042* (2013.01); *H04L 1/0061* (2013.01); *H04L 5/0053* (2013.01); *H04L 27/2666* (2013.01); *H04L 27/2673* (2013.01); *H04W 56/001* (2013.01); *H04W 72/005* (2013.01); *H04W 72/0446* (2013.01); *H04W 72/0493* (2013.01); *H04W 76/11* (2018.02)

(58) Field of Classification Search
CPC .................. H04W 72/042; H04L 27/2666
See application file for complete search history.

(56) References Cited

U.S. PATENT DOCUMENTS

2018/0242367 A1  8/2018  Kim et al.
2018/0248642 A1  8/2018  Si et al.
(Continued)

FOREIGN PATENT DOCUMENTS

EP    3413637 A1   12/2018
WO    2018106043 A1  6/2018
(Continued)

OTHER PUBLICATIONS

International Search Report and Written Opinion of the International Searching Authority in connection with International Application No. PCT/KR2020/007777 dated Oct. 6, 2020, 10 pages.
(Continued)

*Primary Examiner* — Jason E Mattis

(57) ABSTRACT

A method and apparatus of a user equipment (UE) are provided. The method and apparatus comprise: identifying spatial parameters for a synchronization signals/physical broadcast channel (SS/PBCH) block and a downlink (DL) signal, wherein the spatial parameters are commonly used for receiving the SS/PBCH block and the DL signal; receiving the SS/PBCH block and the DL signal, wherein the
(Continued)

Example 1

Example 2

SS/PBCH block and the DL signal are time division multiplexed in a same slot; and determining information from the DL signal.

20 Claims, 23 Drawing Sheets

(51) Int. Cl.
    *H04W 72/00*       (2023.01)
    *H04W 72/0446*   (2023.01)
    *H04L 27/26*       (2006.01)
    *H04W 76/11*      (2018.01)
    *H04L 1/00*        (2006.01)
    *H04L 5/00*        (2006.01)

(56) References Cited

U.S. PATENT DOCUMENTS

| | | | | |
|---|---|---|---|---|
| 2018/0376484 | A1* | 12/2018 | Beale | H04W 72/10 |
| 2019/0141693 | A1* | 5/2019 | Guo | H04W 72/042 |
| 2019/0223145 | A1* | 7/2019 | Jung | H04W 76/27 |
| 2019/0313445 | A1* | 10/2019 | Tsai | H04L 5/0007 |
| 2019/0342907 | A1* | 11/2019 | Huang | H04L 5/0091 |
| 2020/0336955 | A1* | 10/2020 | Bao | H04W 24/10 |
| 2021/0258967 | A1* | 8/2021 | Zhang | H04W 72/042 |
| 2021/0345293 | A1* | 11/2021 | Park | H04B 7/08 |

FOREIGN PATENT DOCUMENTS

| | | | |
|---|---|---|---|
| WO | 2018106075 | A1 | 6/2018 |
| WO | 2018232199 | A1 | 12/2018 |
| WO | 2019099661 | A1 | 5/2019 |

OTHER PUBLICATIONS

Ericsson, "Feature lead summary for beam management—Thursday," R1-1809864, 3GPP TSG RAN WG1 Meeting #94, Gothenburg, Aug. 20-24, 2018, 26 pages.

NTT Docomo, Inc, "Work plan for Rel-15 NR WI," R1-1718177, 3GPP TSG RAN WG1 Meeting #90bis, Prague, CZ, Oct. 9-13, 2017, 173 pages.

LG Electronics, "Discussion on QCL for NR," R1-1707619, 3GPP TSG RAN WG1 Meeting #89, Hangzhou, P.R. China, May 15-19, 2017, 3 pages.

Qualcomm et al., "WF on Sync signal Structure," R1-1613154, 3GPP TSG RAN WG1 Meeting #87, Reno, USA, Nov. 14-18, 2016, 3 pages.

"3rd Generation Partnership Project; Technical Specification Group Radio Access Network; NR; Physical channels and modulation (Release 15)", 3GPP TS 38 211 V15 5.0, Mar. 2019, 96 pages.

"3rd Generation Partnership Project; Technical Specification Group Radio Access Network; NR; Multiplexing and channel coding (Release 15)", 3GPP TS 38.212 V15.5 0, Mar. 2019, 101 pages.

"3rd Generation Partnership Project; Technical Specification Group Radio Access Network; NR; Physical layer procedures for control (Release 15)", 3GPP TS 38.213 V15.5.0, Mar. 2019, 104 pages.

"3rd Generation Partnership Project; Technical Specification Group Radio Access Network; NR; Physical layer procedures for data (Release 15)", 3GPP TS 38.214 V15.5.0, Mar. 2019, 103 pages.

"3rd Generation Partnership Project; Technical Specification Group Radio Access Network; NR; Radio Resource Control (RRC) protocol specification, (Release 15)", 3GPP TS 38.331 V15.5.0, Mar. 2019, 491 pages.

Extended European Search Report dated Aug. 1, 2022 regarding Application No. 20826875.5, 11 pages.

* cited by examiner

US 11,582,733 B2

METHOD AND APPARATUS FOR SS/PBCH BLOCK REPETITION

CROSS-REFERENCE TO RELATED APPLICATIONS AND CLAIM OF PRIORITY

The present application claims priority to U.S. Provisional Patent Application No. 62/863,481 filed on Jun. 19, 2019 and U.S. Provisional Patent Application No. 62/870,379 filed on Jul. 3, 2019. The contents of the above-identified patent documents are incorporated herein by reference.

TECHNICAL FIELD

The present application relates generally to wireless communication systems, more specifically, the present disclosure relates to SS/PBCH block repetition.

BACKGROUND

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

SUMMARY

The present disclosure relates to a pre-5G or 5G communication system to be provided for SS/PBCH block repetition.

In one embodiment, a user equipment (LTE) is provided. The UE comprises a processor configured to identify spatial parameters for a synchronization signals/physical broadcast channel (SS/PBCH) block and a downlink (DL) signal, wherein the spatial parameters are commonly used for receiving the SS/PBCH block and the DL signal. The UE further comprises a transceiver operably connected to the processor, the transceiver configured to receive the SS/PBCH block and the DL signal, wherein the SS/PBCH block and the DL signal are time division multiplexed in a same slot. The processor of the UE is further configured to determine information from the DL signal.

In another embodiment, a base station (BS) is provided. The BS comprises a processor configured to identify spatial parameters for a synchronization signals/physical broadcast channel (SS/PBCH) block and a downlink (DL) signal, wherein the spatial parameters are commonly used for transmitting the SS/PBCH block and the DL signal. The BS further comprises a transceiver operably connected to the processor, the transceiver configured to transmit the SS/PBCH block and the DL signal, wherein the SS/PBCH block and the DL signal are time division multiplexed in a same slot, the DL signal comprising information.

In yet another embodiment, a method of a user equipment (UE) is provided. The method comprises: identifying spatial parameters for a synchronization signals/physical broadcast channel (SS/PBCH) block and a downlink (DL) signal, wherein the spatial parameters are commonly used for receiving the SS/PBCH block and the DL signal; receiving the SS/PBCH block and the DL signal, wherein the SS/PBCH block and the DL signal are time division multiplexed in a same slot; and determining information from the DL signal.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.5.0, "NR; Physical channels and modulation;" 3GPP TS 38.212 v15.5.0, "NR; Multiplexing and Channel coding;" 3GPP TS 38.213 v15.5.0, "NR; Physical Layer Procedures for Control;" 3GPP TS 38.214 v15.5.0, "NR; Physical Layer Procedures for Data;" and 3GPP TS 38.331 v15.5.0, "NR; Radio Resource Control (RRC) Protocol Specification."

Figure 1:
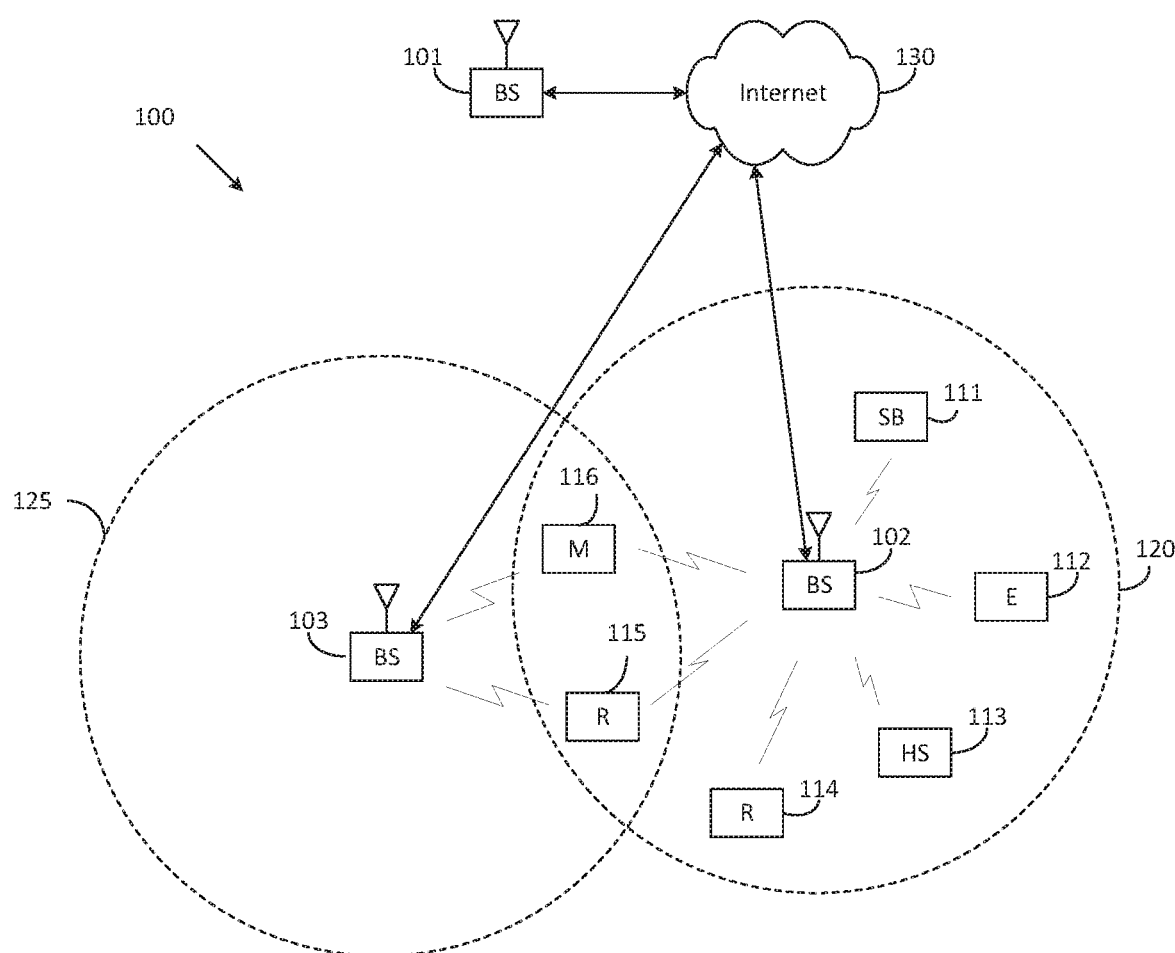
FIG. 1 illustrates an example wireless network according to embodiments of the present disclosure.
Figure 2:
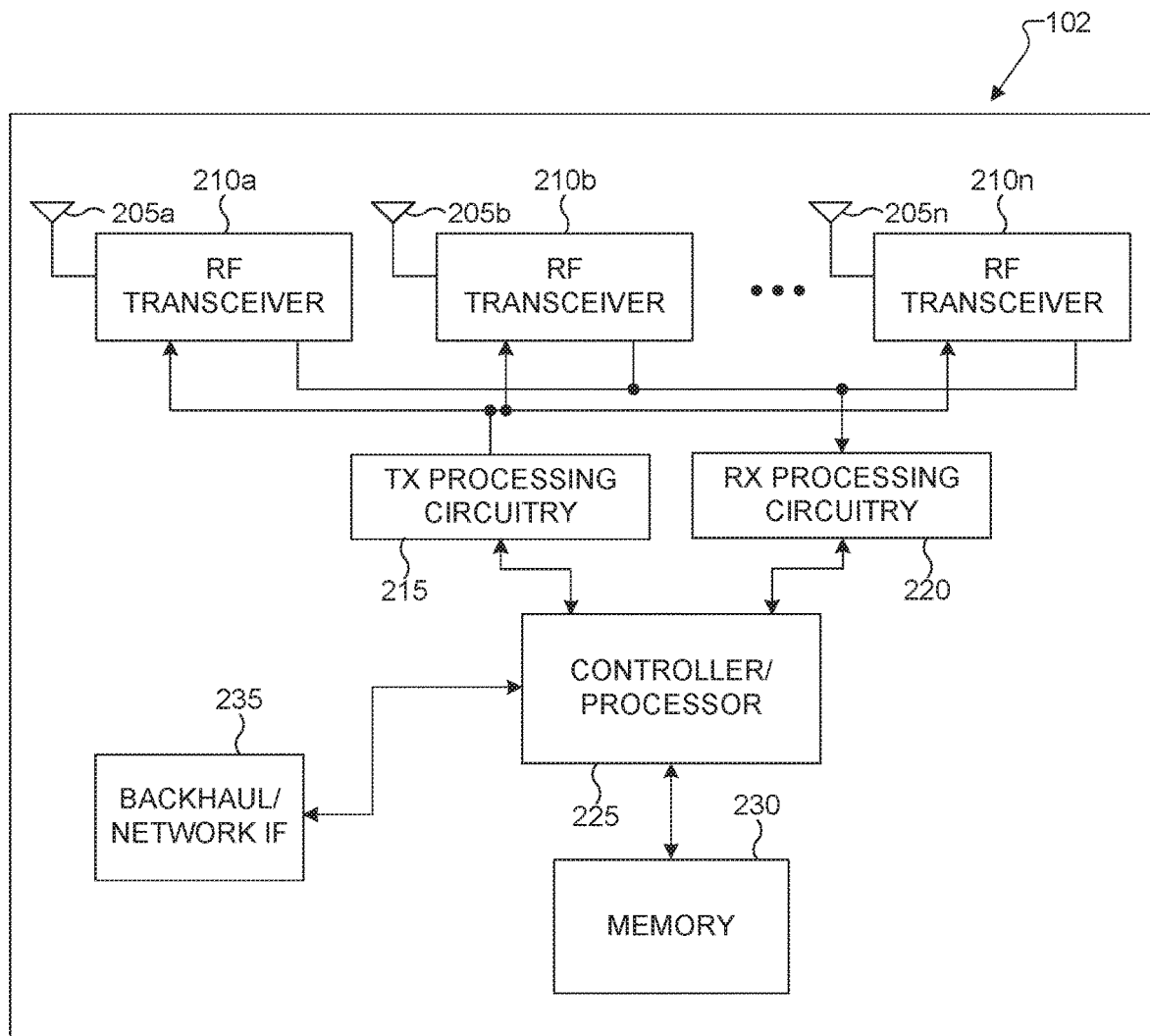
FIG. 2 illustrates an example gNB according to embodiments of the present disclosure.
Figure 3:
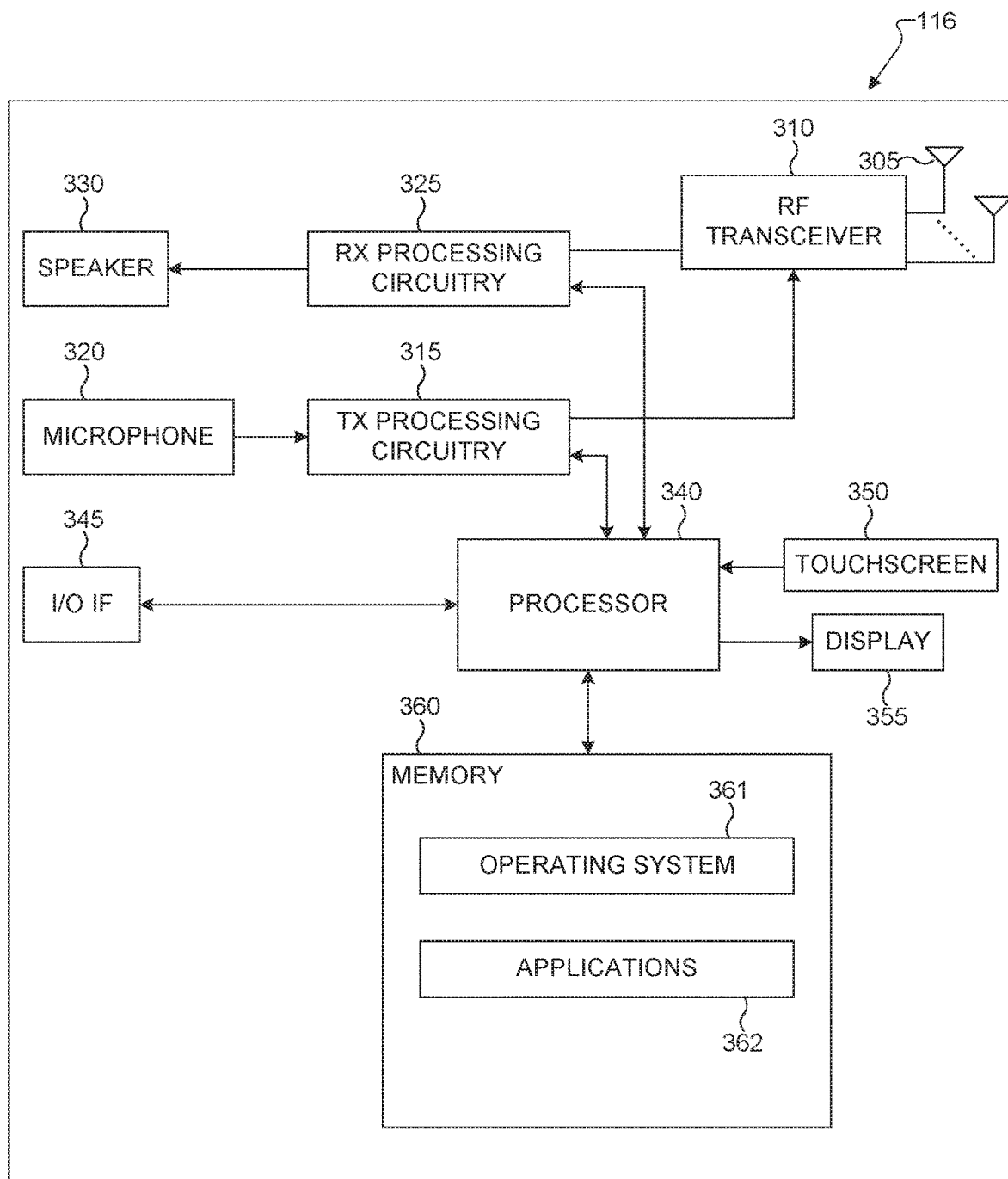
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the LIE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTL system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MEMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
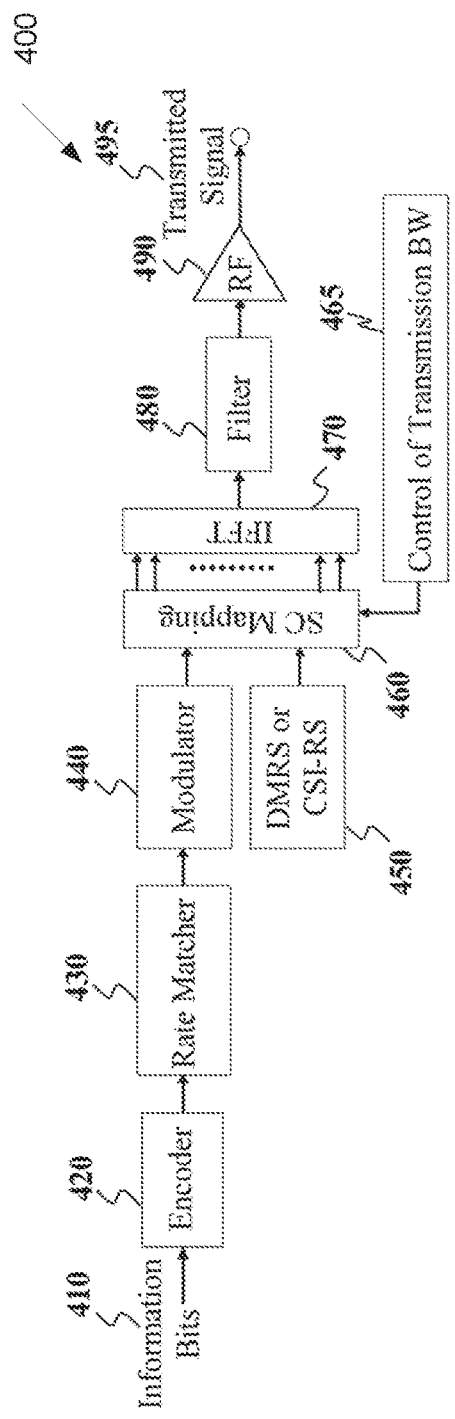
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/ frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by a radio frequency (RF) unit 495.

Figure 5:
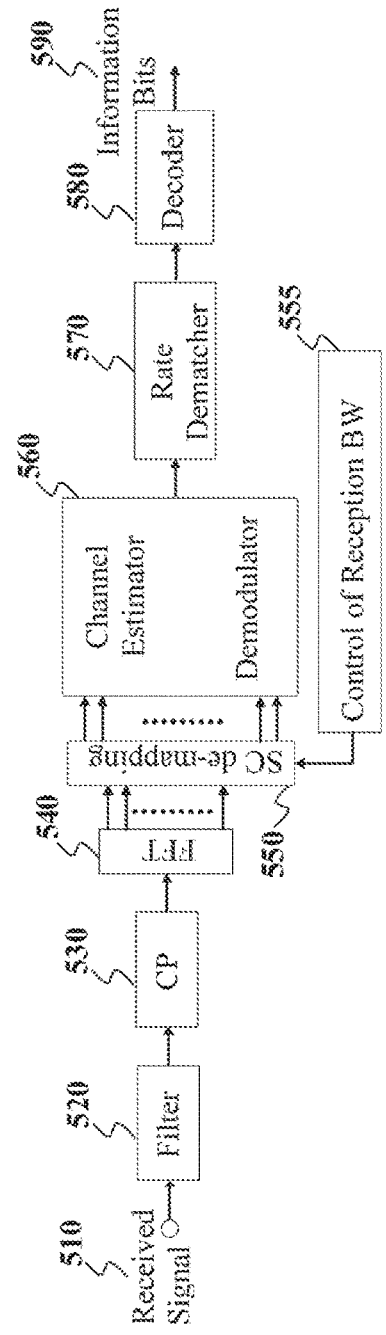
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
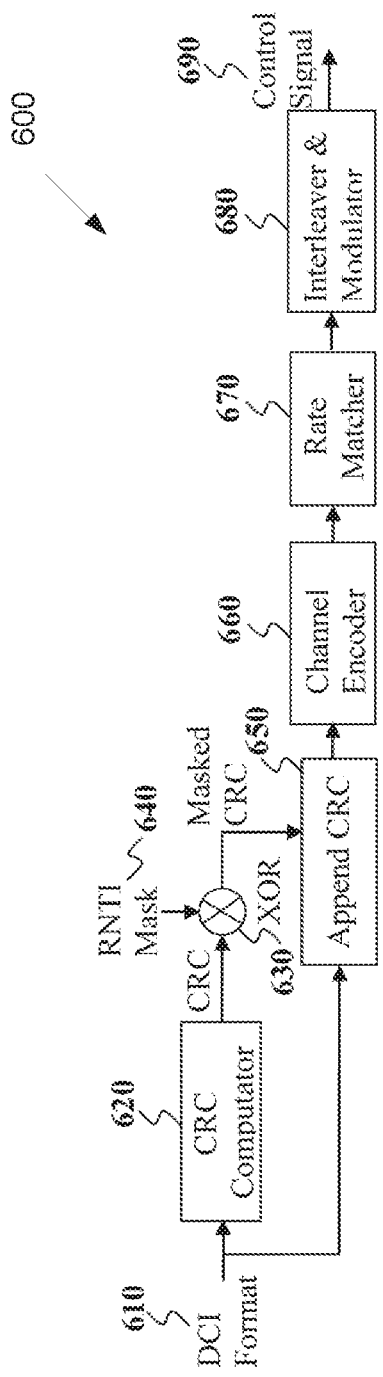
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation 630 between CRC bits and RNTI bits 640. The XOR operation is defined as XOR (0, 0)=0, XOR (0, 1)=1, XOR (1, 0)=1, XOR (1, 1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

Figure 7:
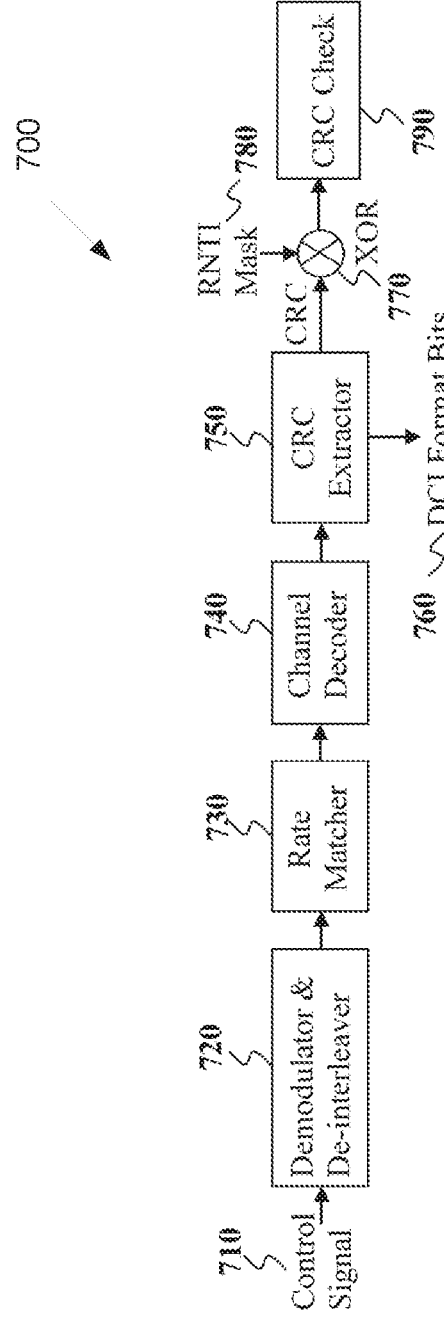
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (checksum is zero), the DCI format information bits are considered to be valid. When the CRC check does not succeed, the DCI format information bits are considered to be invalid.

Figure 8:
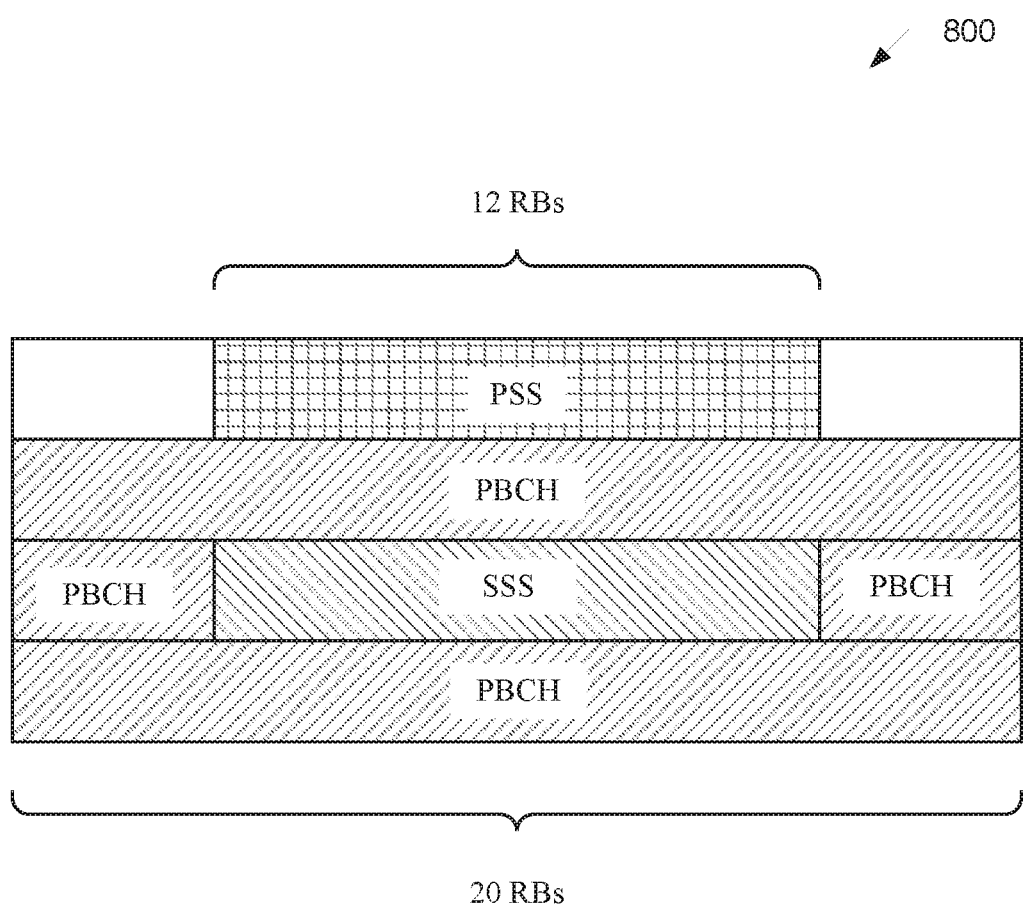
FIG. 8 illustrates an NR SS/PBCH block composition according to embodiments of the present disclosure.

FIG. 8 illustrates an NR SS/PBCH block composition 800 according to embodiments of the present disclosure. An embodiment of the NR SS/PBCH block composition 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

New radio (NR) also supports synchronization through synchronization signals transmitted on downlink. comparing to long-term evolution (LTE), NR supports larger range of carrier frequencies, and more flexibly numerology. For example, NR Rel-15 supports multiple synchronization signals and physical broadcast channel blocks (SS/PBCH block or SSB) on each carrier frequency range, wherein each SS/PBCH block compromises of four consecutive orthogonal frequency division multiplexing (OFDM) symbols as illustrated in FIG. 8, wherein the first symbol is mapped for primary synchronization signal (PSS), the second and forth symbols are mapped for PBCH, and the third symbol is mapped for both secondary synchronization signal (SSS) and PBCH.

The same SS/PBCH block composition is applied to all supported carrier frequency ranges in NR, which spans from 0 GHz to 52.6 GHz. The transmission bandwidth of PSS and SSS (e.g., 12 resource blocks (RBs)) is smaller than the transmission bandwidth of the whole SS/PBCH block (e.g., 20 RBs). In every RB mapped for PBCH, 3 out of the 12 resource elements (REs) are mapped for the demodulation reference signal (DMRS) of PBCH, wherein the 3 REs are uniformly distributed in the PRB and the starting location of the first RE is based on cell identity (ID).

Moreover, NR Rel-15 supports one or two subcarrier spacings (SCSs) for an SS/PBCH block, for a given band, wherein the same SCS is utilized for PSS, SSS, and PBCH (including its DMRS). For carrier frequency range 0 GHz to 6 GHz, 15 kHz and/or 30 kHz can be utilized for the SCS of SS/PBCH block. For carrier frequency range 6 GHz to 52.6 GHz, 120 kHz and/or 240 kHz can be utilized for the SCS of the SS/PBCH block.

The sequence constructing PSS is based on M-sequence with cyclic shifts to represent the cell ID information carried by PSS, and the sequence constructing SSS is based on Gold-sequence (exclusive or of two M-sequences), wherein each M-sequence constructing the Gold-sequence performs cyclic shift to represent the cell ID information carried by SSS.

Figure 9:
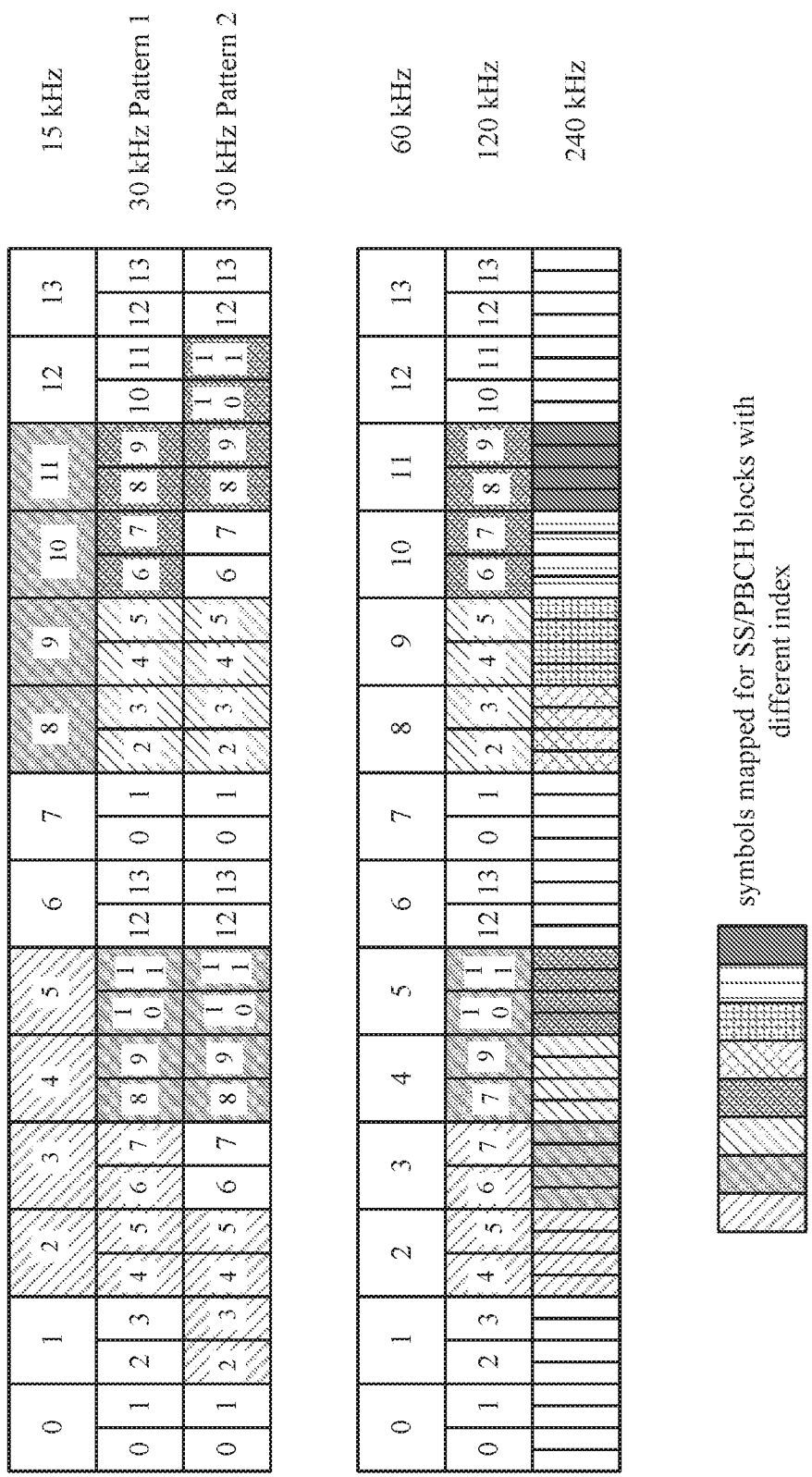
FIG. 9 illustrates an example NR SS/PBCH block pattern in time domain according to embodiments of the present disclosure.

FIG. 9 illustrates an example NR SS/PBCH block pattern in time domain 900 according to embodiments of the present disclosure. An embodiment of the NR SS/PBCH block pattern in time domain 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

In NR Rel-15, SS/PBCH blocks could be transmitted in a beam-sweeping way up to network implementation, and multiple candidate location for transmitting SS/PBCH blocks are predefined within a unit of half frame. The mapping pattern of SS/PBCH blocks to 1 slot with respect to 15 kHz as the reference SCS for frequency range 1 (FR1) from 410 MHz to 7.125 GHz and with respect to 60 kHz as the reference SCS for frequency range 2 (FR2) from 24.25 GHz to 52.6 GHz are illustrated in FIG. 9.

Two mapping patterns are designed for 30 kHz SCS of the SS/PBCH block: Pattern 1 is utilized for non-LTE-NR coexistence bands; and Pattern 2 is utilized for LTE-NR coexistence bands.

Figure 10:
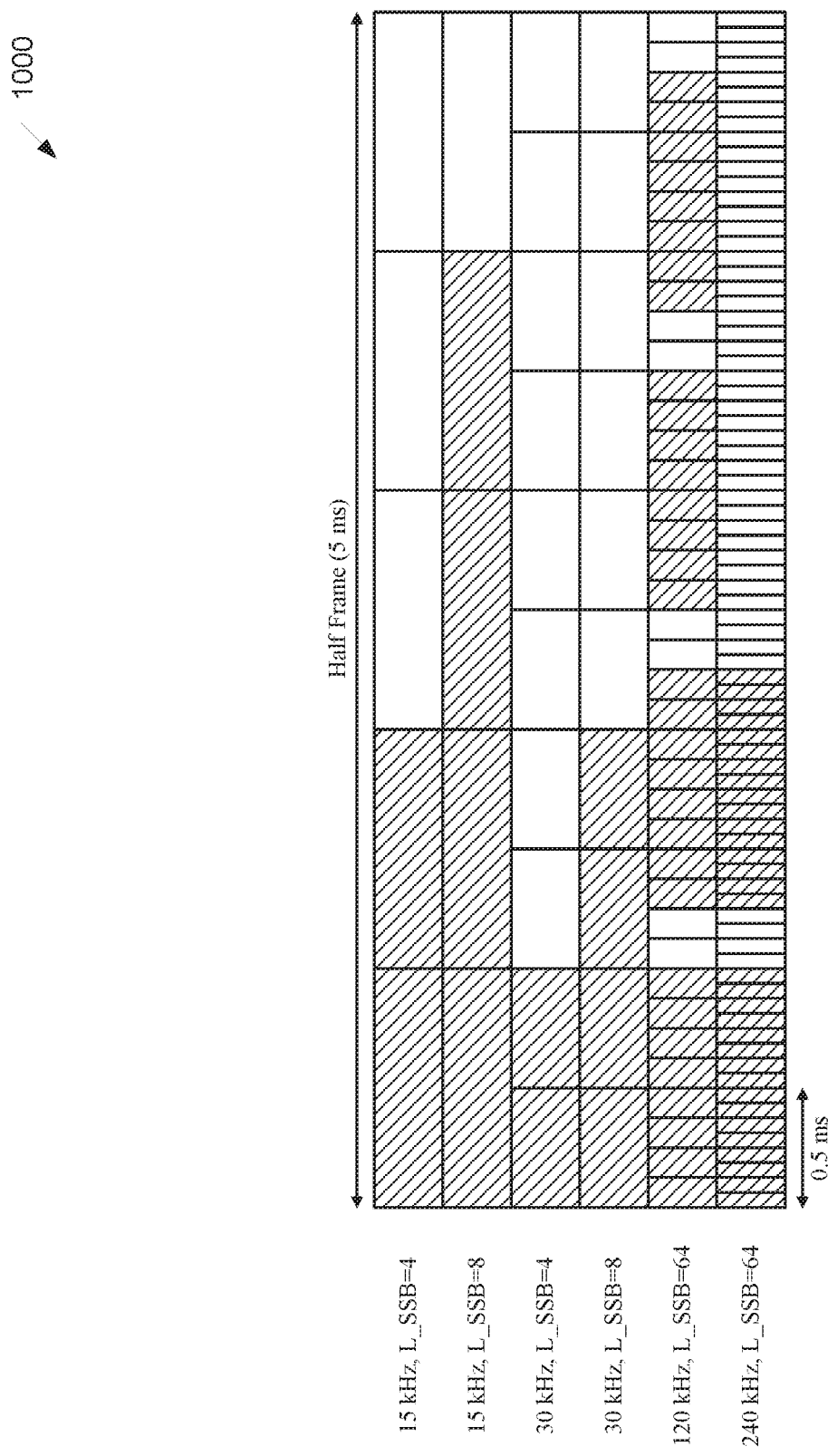
FIG. 10 illustrates an example predefined NR SS/PBCH block location within a half frame according to embodiments of the present disclosure.

FIG. 10 illustrates an example predefined NR SS/PBCH block location within a half frame 1000 according to embodiments of the present disclosure. An embodiment of the predefined NR SS/PBCH block location within a half frame 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

The maximum number of SS/PBCH blocks in a period, denoted as L_SSB, is determined based on carrier frequency range: for carrier frequency range 0 GHz to 3 GHz, L_SSB is 4; for carrier frequency range 3 GHz to 6 GHz, L_SSB is 8; for carrier frequency range 6 GHz to 52.6 GHz, L_SSB is 64. The determination of the slots within the half frame unit which contains the candidate locations of SS/PBCH blocks, with respect to each combination of SSB SCS and L_SSB, is illustrated in FIG. 10.

In an initial cell selection, a user equipment (UE) assumes a default SSB burst set periodicity as 20 ms, and for detecting non-standalone NR cell, network provides one SSB burst set periodicity information per frequency carrier to UE and information to derive measurement timing/duration if possible.

For a type of UE devices beyond NR Rel-15, the type of UE devices may work in a different application scenario with low device complexity, such as smart watches, video surveillance cameras, industrial sensors, which may not have the same level of implementation complexity as high end devices, and may not have the same level of performance requirement as well. For this type of UE devices, there is a need for coverage enhancement or performance loss compensation, and initial access including time-domain and frequency-domain synchronization, cell ID detection, and system information delivery are some key aspects included.

This disclosure focuses on the design of SS/PBCH block repetition for coverage enhancement, wherein the repetition refers to extra SS/PBCH block transmission with QCL assumption at the UE side to facilitate combining of SS/PBCH blocks.

This disclosure focuses on the design of SS/PBCH block repetition for coverage enhancement, wherein the repetition refers to extra SS/PBCH block transmission with QCL assumption at the UE side to facilitate combining of SS/PBCH blocks. The key issues related to determination of time/frequency resources for repeated SS/PBCH blocks and the repeated SS/PBCH block transmission are for the timing determination, the QCL assumption acquisition, and the indication of actually transmitted SS/PBCH blocks.

The components of this disclosure include the following: potential SS/PBCH block location enhancement; time-domain repetition enhancement; frequency-domain hopping enhancement; and frequency-domain repetition enhancement.

In NR Rel-15, the SS/PBCH blocks are transmitted according to predefined time-domain locations (e.g., potential SSB locations) within a half frame (e.g., 5 ms). The slots containing the potential SSB locations start from the first slot within the half frame and spans consecutive slots (other than in FR2 wherein some of the slots are reserved) until the maximum number of potential SSB locations is achieved. Hence, for some cases, the last slots within a half frame does not contain any potential SSB locations, as shown in FIG. 10.

In one embodiment, the time-domain potential SSB locations can be extended from NR Rel-15.

Figure 11:
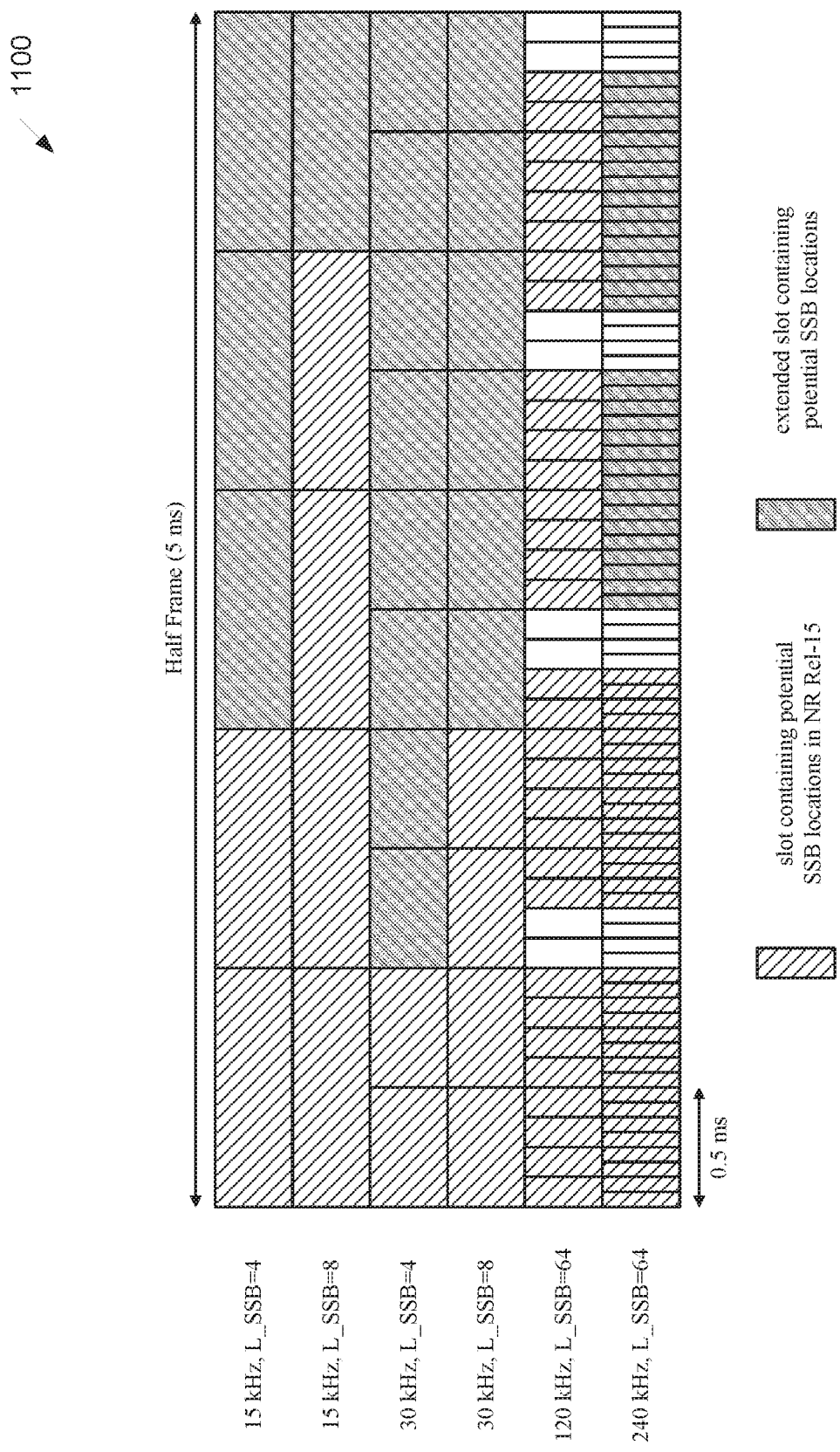
FIG. 11 illustrates an example extended potential SSB locations within a half frame according to embodiments of the present disclosure.

FIG. 11 illustrates an example extended potential SSB locations within a half frame 1100 according to embodiments of the present disclosure. An embodiment of the extended potential SSB locations within a half frame 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

In one embodiment, the slot(s) containing potential SSB locations within a half frame can be extended from NR Rel-15 as illustrated in FIG. 11. For example, extended to the end of the half frame. For another example, some of the remaining slots within a half frame can be utilized for extended potential SSB locations, such as to double the number of totally potential SSB locations.

In one embodiment, the time unit to contain potential SSB locations can be extended from a half frame to a lager time duration. In one example, the time unit can be extended to one frame (e.g., 10 ms). In another example, the time unit can be extended to 20 ms (which is the assumed default periodicity for initial access for NR Rel-15 legacy UEs).

Figure 12:
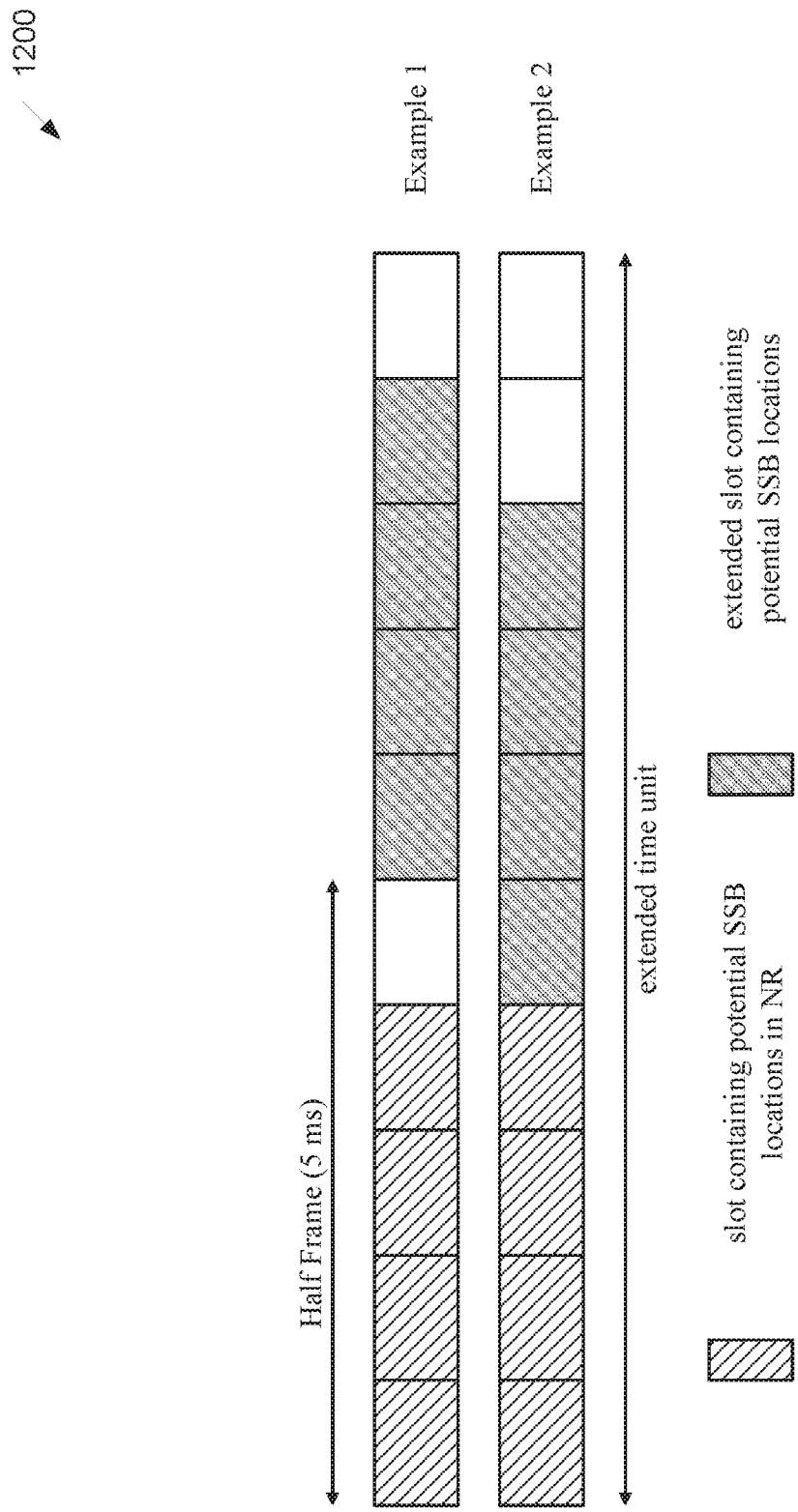
FIG. 12 illustrates an example extended potential SSB locations beyond a half frame according to embodiments of the present disclosure.

FIG. 12 illustrates an example extended potential SSB locations beyond a half frame 1200 according to embodiments of the present disclosure. An embodiment of the extended potential SSB locations beyond a half frame 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

In one embodiment, the above approaches can be combined, e.g., extending the time unit to contain potential SSB locations and extending the potential SSB locations within the extended time unit at the same time. In one example, the NR Rel-15 potential SSB locations are extended to other half frames within the extended unit as shown in example 1 of FIG. 12. In another example, the potential SSB locations are extended right after the end of potential SSB locations of NR Rel-15 as shown in example 2 of FIG. 12.

In one embodiment, the signals in the SSBs mapped to the extended SSB locations could be different from the ones in the SSBs mapped to the NR Rel-15 SSB locations.

In one embodiment, the primary synchronization signal (PSS) in the SSBs mapped to the extended SSB locations could be different from the one in the SSBs mapped to the NR Rel-15 SSB locations, such that the sequence for PSS in the SSBs mapped to the extended SSB locations has low cross correlation with the sequence for PSS in the SSBs mapped to the NR Rel-15 SSB locations.

In one example, the generator for PSS sequence in the SSBs mapped to the extended SSB locations is the same as NR Rel-15, but the applied cyclic shifts to the PSS sequence are different from NR Rel-15 In another example, the generator for PSS sequence in the SSBs mapped to the extended SSB locations is from the NR Rel-15.

In one embodiment, the secondary synchronization signal (SSS) in the SSBs mapped to the extended SSB locations could be different from the one in the SSBs mapped to the NR Rel-15 SSB locations, such that the sequence for SSS in the SSBs mapped to the extended SSB locations has low cross correlation with the sequence for SSS in the SSBs mapped to the NR Rel-15 SSB locations.

In one example, the set of SSS sequences in the SSBs mapped to the extended SSB locations are same as NR Rel-15, but with an extra fixed cyclic shift value. In another example, the cell ID carried by the SSS sequence in the SSBs mapped to the extended SSB locations has a determined relationship with the cell ID carried by the SSS sequence in the SSBs mapped to the NR Rel-15 SSB locations in the same time unit.

In one embodiment, the DMRS sequence of PBCH in the SSBs mapped to the extended SSB locations could be different from the one in the SSBs mapped to the NR Rel-15 SSB locations, such that the sequence for DMRS of PBCH in the SSBs mapped to the extended SSB locations has low cross correlation with the sequence for DMRS of PBCH in the SSBs mapped to the NR Rel-15 SSB locations.

In one example, the initial condition of DMRS sequence of PBCH in the SSBs mapped to the extended SSB locations is different from the one in NR Rel-15, wherein the SSB index can be extended from NR Rel-15.

In one embodiment, the index of the potential SSB locations in the time unit can be acquired by the UE when receiving the SSB, wherein the SSB location and/or time unit could be extended from NR Rel-15.

In one embodiment, the index of the potential SSB locations in the time unit can be indicated by the DMRS sequence of PBCH in the corresponding SSB, wherein the DMRS sequence can be extended from NR Rel-15. For example, the number of DMRS sequence could be increased in order to indicate all the potential SSB locations within a half frame.

In one embodiment, the index of the potential SSB locations in the time unit can be indicated by the combination of DMRS sequence of PBCH and the content of PBCH in the corresponding SSB.

In one embodiment, the indication of actually transmitted SSBs could be extended from NR Rel-15.

In one embodiment, the indication of actually transmitted SSB is by a bitmap, wherein the bit-width of the bitmap is same as the number of potential SSB locations within a half frame (e.g., potential SSB locations could be extended).

In one embodiment, the indication of actually transmitted SSB is by a bitmap, wherein the bit-width of the bitmap is same as the number of potential SSB locations within the extended time unit (e.g., potential SSB locations could also be extended).

SS/PBCH blocks (SSBs) can be repeated in time-domain for coverage enhancement or coverage recovery for low cost UEs, wherein in one example, repeated SSBs refer to the SSBs with QCL assumption from the UE point of view, and the other information and/or message carried by physical layer signals/channels in the repeated SSBs may or may not be the same as the original SSB. Note that the time-domain repetition patterns can be based on NR Rel-15 potential SSB locations and/or enhancements described in this disclosure.

At least one of the following time-domain repetition patterns could be supported for coverage enhancement. In one example, only one of the patterns is supported, and the pattern is assumed by the UE for initial access. In another example, more than one patterns are supported, and the pattern is indicated to the UE, e.g., using master information block (MIB) or system information block (SIB), and the UE needs to blind detect the pattern in initial access.

In a first time-domain repetition pattern (e.g., time-domain repetition pattern 1), the SS/PBCH block burst set, which is transmitted periodically, includes K bursts (e.g., K is an integer and K≥1), wherein each of the K bursts further includes R repeated SS/PBCH blocks (e.g., R is an integer and R≥1). In this time-domain repetition pattern, the UE assumes the SSBs within a burst are QCLed. An illustration of the time-domain repetition pattern 1 is shown in FIG. 13.

Figure 13:
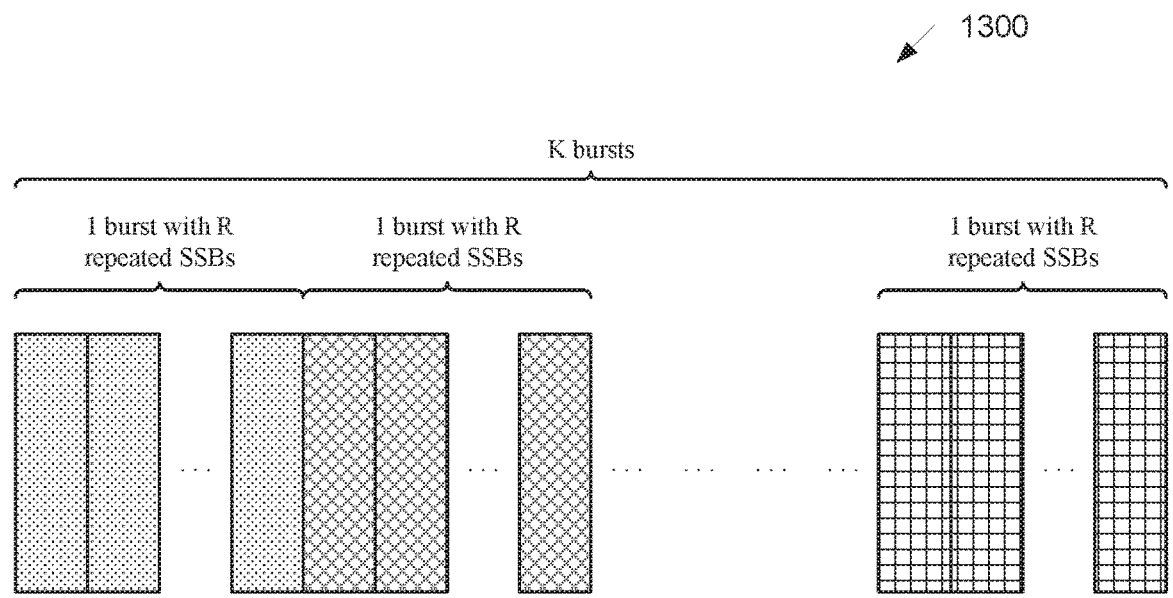
FIG. 13 illustrates an example first time-domain repetition pattern according to embodiments of the present disclosure.

FIG. 13 illustrates an example first time-domain repetition pattern 1300 according to embodiments of the present disclosure. An embodiment of the first time-domain repetition pattern 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

Note that the illustration in FIG. 13 only describes the relative time-domain locations among SSBs and the QCL assumption, and the potential time-domain gaps between SSBs are not illustrated explicitly.

In one embodiment for the time-domain repetition pattern 1, each burst of repeated SSBs is confined within a time-domain unit, and the time-domain locations for potentially transmitted SSBs are predefined within the time-domain unit. An illustration of this embodiment is shown in FIG. 14.

Figure 14:
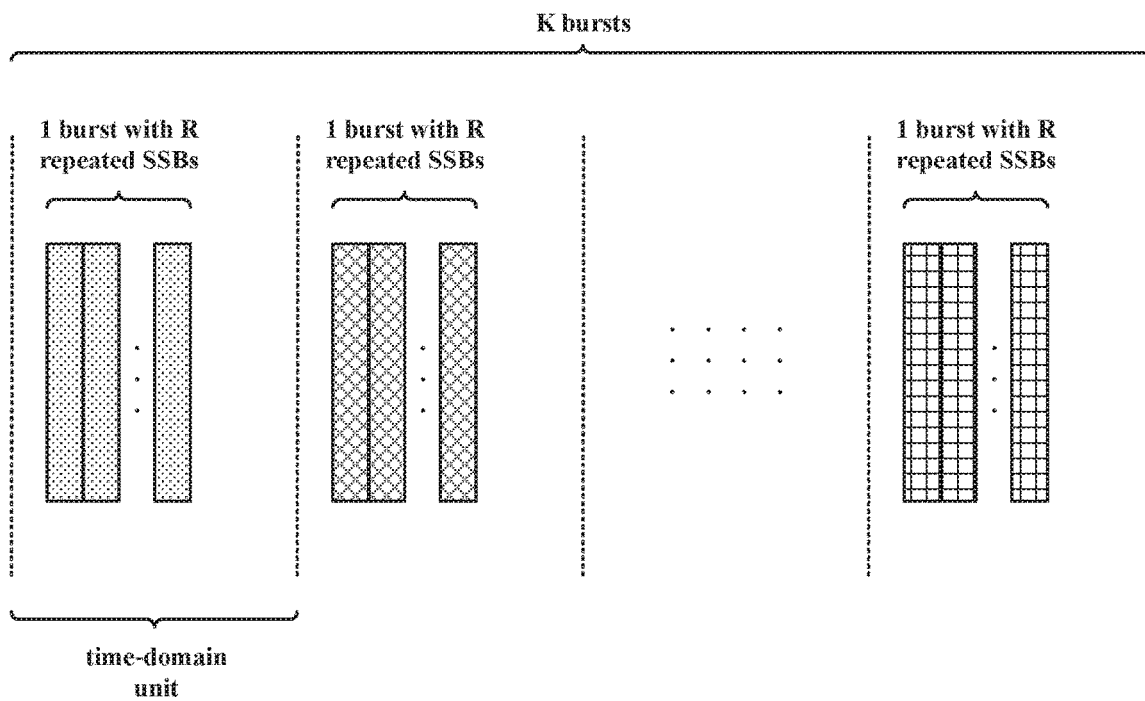
FIG. 14 illustrates another example first time-domain repetition pattern according to embodiments of the present disclosure.

FIG. 14 illustrates another example first time-domain repetition pattern 1400 according to embodiments of the present disclosure. An embodiment of the first time-domain repetition pattern 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

In one example, the time-domain unit can be a half frame (i.e., with 5 ms duration).

In one example, the number of repetitions within the time-domain unit is fixed. For one example, R is fixed as 4.

In one example, the number of repetitions within the time-domain unit is configurable. For one example, R is configurable, and the maximum number of R does not exceed the maximum number of SSBs defined per carrier frequency range in NR Rel-15 (e.g., L_SSB). For another example, the configuration of R is implicitly carried by the indication of the actually transmitted SSBs within the time-domain unit.

In one example, the index of SSB within the burst of R repeated SSBs is carried by the DMRS sequence of PBCH within the SSB.

In one example, the index of burst containing R repeated SSBs is carried by the content of PBCH within the SSB.

In one example, the UE assumes the information, other than part of the timing related information, carried by the physical layer signal/channel in the SSBs is the same for the SS/PBCH blocks within a burst e.g., at least the MIB carried in PBCH in the SSBs.

In one example, the time-domain locations for transmitting the repetitions can be configurable, and the configuration is carried by the indication of the actually transmitted SSBs within the time-domain unit. For example, for each burst within the time-domain unit, the maximum number of repeated SSBs and the time-domain locations for SS/PBCH blocks (e.g., potential SSB locations) can be same as NR Rel-15.

The slots containing the potential SSB locations start from the first slot within the time-domain unit and spans consecutive slots (other than in FR2 wherein some of the slots are reserved) until the maximum number of potential SSB locations is achieved. The actually transmitted SSBs are mapped to the potential SSB locations and are indicated in SIB and RRC parameters.

In one example, the time-domain gap between two consecutive bursts (e.g., denoted as N^gap_slot, in the unit of one slot) can be either predefined in the specification of the system operation (e.g., N^gap_slot=0), or provided to the UE through higher layer signaling.

In one example, the UE assumes the SSBs with the same burst index are QCLed.

Figure 15:
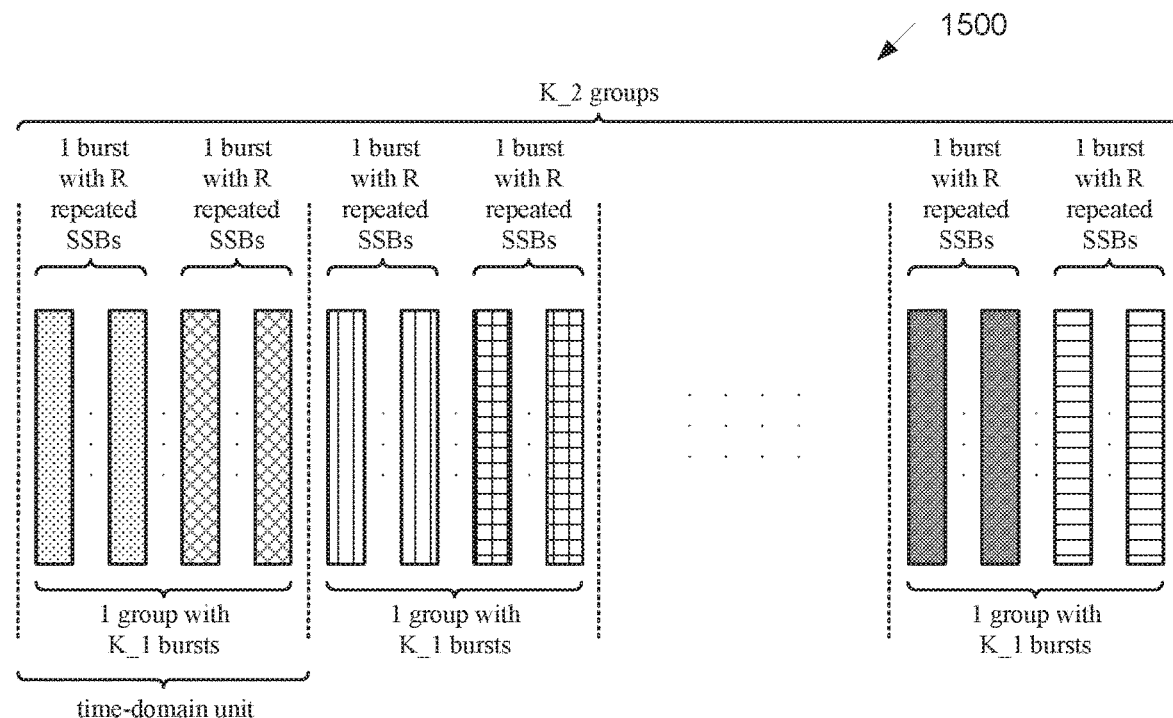
FIG. 15 illustrates yet another example first time-domain repetition pattern according to embodiments of the present disclosure.

In one embodiment for the time-domain repetition pattern 1, a group of bursts of repeated SSBs are confined within a time-domain unit (e.g., with group size K_1), and the time-domain locations for potentially transmitted SSBs are predefined within the time-domain unit, and the SS/PBCH block burst set includes one or multiple groups (e.g., K_2 groups), as illustrated in FIG. 15.

FIG. 15 illustrates yet another example first time-domain repetition pattern 1500 according to embodiments of the present disclosure. An embodiment of the first time-domain repetition pattern 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

In one example, the time-domain unit can be a half frame (i.e., with 5 ms duration).

In one example, the number of repetitions within the time-domain unit is fixed. For one example, R is fixed as 4. For another example, although the number of repetitions is fixed, the time-domain locations for transmitting the R repetitions can be configurable, and the configuration is carried by the indication of the actually transmitted SSBs within the time-domain unit.

In one example, the number of repetitions within the time-domain unit is configurable. For one example, R is configurable, and the maximum number of SSBs (e.g., R*K_1) does not exceed the maximum number of SSBs defined per carrier frequency range in NR Rel-15 (e.g., L_SSB). For another example, the configuration of R is implicitly carried by the indication of the actually transmitted SSBs within the time-domain unit.

In one example, the index of SSB within the burst of R repeated SSBs is carried by the DMRS sequence of PBCH within the SSB.

In one example, the index of group containing one or multiple bursts is indicated to the UE. In one example, the indication is carried by the most significant bit(s) (MSB(s)) of DMRS sequence of PBCH within the SSB. In another example, the indication is carried by the content of PBCH within the SSB. In yet another example, the indication is carried by the combination of the MSB(s) of DMRS sequence of PBCH within the SSB and the content of the PBCH within the SSB.

In one example, the index of burst containing R repeated SSBs is carried by the content of PBCH within the SSB.

In one example, the UE assumes the information, other than part of the timing related information, carried by the physical layer signal/channel in the SSBs is the same for the SS/PBCH blocks within a burst e.g., at least the MIB carried in PBCH in the SSBs.

In one example, the UE assumes the SSBs with the same group index and burst index within the same group are QCLed.

In one example, R and K_1 can be configurable, and the product of R and K_1 is fixed (e.g., at least fixed for a given carrier frequency range). For example, for carrier frequency range with a maximum number of transmitted SSBs in a period as L_SSB=8, R*K_1 can also be fixed as 8, such as the combination of {R, K_1} can be taken from {1, 8}, {2, 4}, {4, 2}, {8, 1}, or a subset of this combinations.

In a second time-domain repetition pattern (e.g., time-domain repetition pattern 2), the SS/PBCH block burst set, which is transmitted periodically, includes R repeated bursts (e.g., R is an integer and R≥1), wherein each of the R repeated bursts includes K SS/PBCH blocks (e.g., K is an integer and K≥1). In this time-domain repetition pattern, the UE assumes the SS/PBCH blocks with the same index within the repeated bursts are QCLed.

Figure 16:
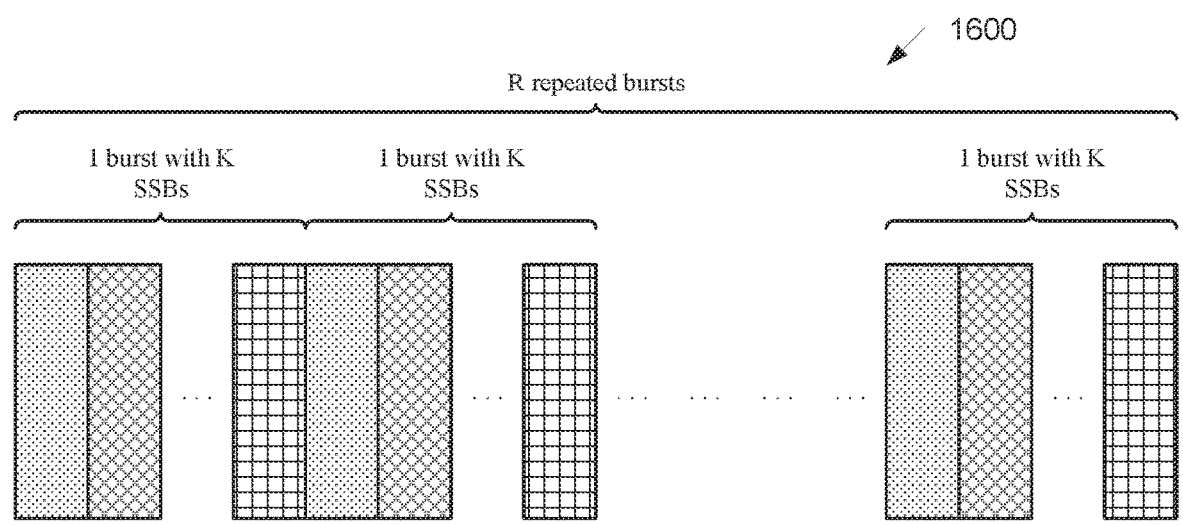
FIG. 16 illustrates an example second time-domain repetition pattern according to embodiments of the present disclosure.

FIG. 16 illustrates an example second time-domain repetition pattern 1600 according to embodiments of the present disclosure. An embodiment of the second time-domain repetition pattern 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

An illustration of the time-domain repetition pattern 2 is shown in FIG. 16. Note that the illustration in FIG. 16 only describes the relative time-domain locations among SSBs and the QCL assumption, and the potential time-domain gaps between SSBs are not illustrated explicitly.

In one embodiment for the time-domain repetition pattern 2, each burst of SSBs is confined within a time-domain unit, and the time-domain locations for potentially transmitted SSBs are predefined within the time-domain unit. An illustration of this embodiment is shown in FIG. 17.

Figure 17:
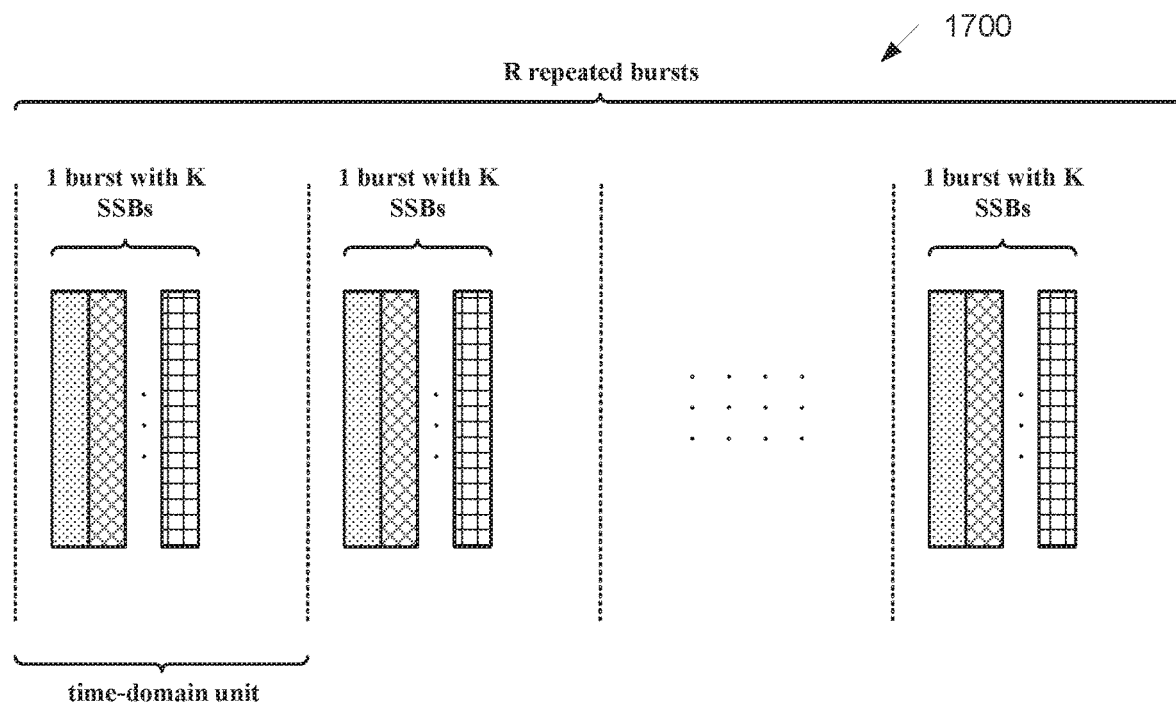
FIG. 17 illustrates another example second time-domain repetition pattern according to embodiments of the present disclosure.

FIG. 17 illustrates another example second time-domain repetition pattern 1700 according to embodiments of the present disclosure. An embodiment of the second time-domain repetition pattern 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

In one embodiment, the time-domain unit can be a half frame (i.e., 5 ms).

In one embodiment, the number of repetitions is fixed. For one example, R is fixed as 4. For another example, the UE assumes the time-domain units, wherein each time-domain unit contains a repeated burst with K SSBs, are consecutive in time domain.

In one embodiment, the number of repetitions is configurable. For one example, R is configurable and indicated in MIB or SIB.

In one embodiment, the R repeated time-domain units start from the first slot within a period.

In one embodiment, the index of SSB within the burst of K SSBs is carried by the DMRS sequence of PBCH within the SSB, or a combination of the DMRS sequence of PBCH within the SSB and the content of PBCH within the SSB, depending on the carrier frequency range. A UE can acquire the timing information within the time-domain unit by detecting the index of SSB within the burst of K SSBs.

In one embodiment, the potential locations for SSB transmission can be extended to every slot of the time-domain unit. In one example, the number of DMRS sequence of PBCH is increased to the same number of potential locations for SSB transmission within the time-domain unit. In another example, the number of DMRS sequence of PBCH maintains the same as in NR Rel-15, and the MSB(s) of the index of the potential locations for SSB transmission in the time-domain unit can be indicated by the content of PBCH.

In one embodiment, the index of burst containing K SSBs is carried by the content of PBCH within the SSB. A UE can acquire the timing information of the time-domain unit by detecting the index of burst containing K SSBs. For example, if the time-domain unit is a half frame, a UE can acquire the timing of half frame by detecting the index of burst containing K SSBs, when there is single burst of SSBs within a time-domain unit.

In one embodiment, the UE assumes the SSBs with the same index of the potential location for SSB transmission within the time-domain unit are QCLed.

In one embodiment, the UE assumes the information, other than part of the timing related information, carried by the physical layer signal/channel in the SSBs is the same for the SS/PBCH blocks with same index within the repeated burst, e.g., at least the MIB carried in PBCH in the SSBs.

Figure 18:
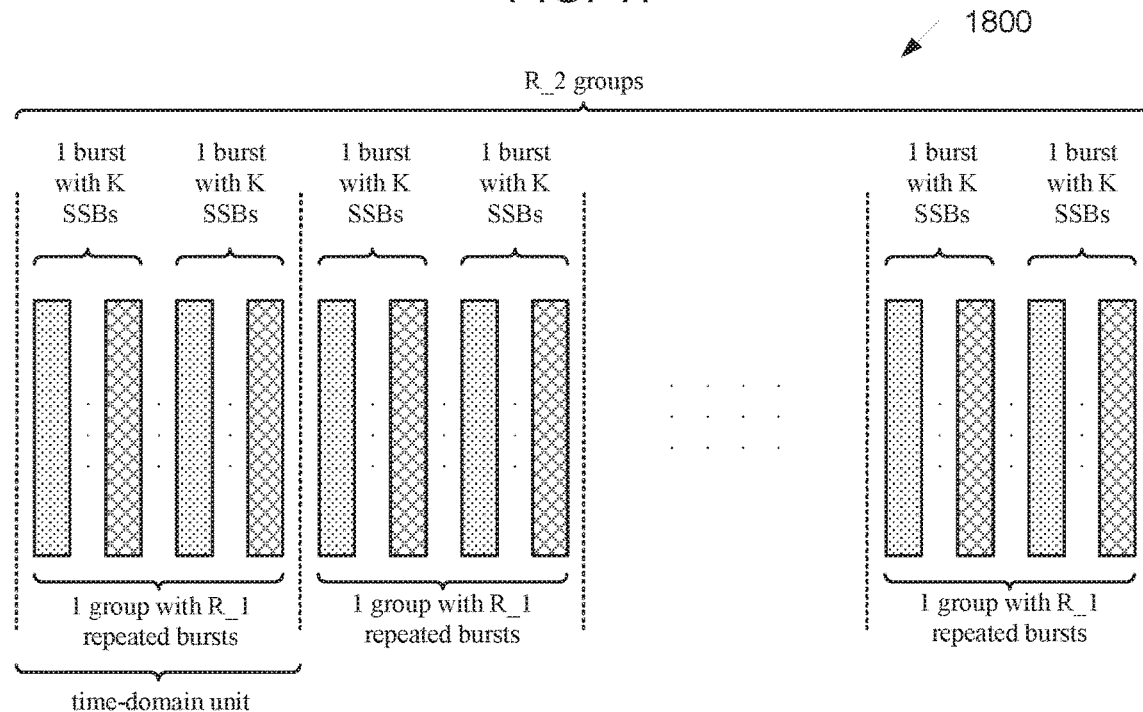
FIG. 18 illustrates an example second time-domain repetition pattern according to embodiments of the present disclosure.

In one embodiment for the time-domain repetition pattern 2, a group of repeated bursts of SSBs is confined within a time-domain unit (e.g., with group size R_1), and the time-domain locations for potentially transmitted SSBs are predefined within the time-domain unit, and the SS/PBCH block burst set includes one or multiple groups (e.g., R_2 groups), as illustrated in FIG. 18.

FIG. 18 illustrates an example second time-domain repetition pattern 1800 according to embodiments of the present disclosure. An embodiment of the second time-domain repetition pattern 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

In one embodiment, the time-domain unit can be a half frame (i.e., 5 ms).

In one embodiment, the number of groups is fixed. For one example, R_2 is fixed as 4. For another example, the UE assumes the time-domain units, wherein each time-domain unit contains a group of bursts, are consecutive in time domain.

In one embodiment, the number of groups is configurable. For one example, R_2 is configurable and indicated in MIB or SIB.

In one embodiment, the number of repeated bursts within a group is configurable. For one example, R_1 is configurable and indicated to the UE (e.g., in MIB or RMSI). For another example, the number of SSBs within a burst K and the number of repeated bursts within a group R_1 are both configurable, and their product K*R_1 is fixed. For yet another example, the number of SSBs within a burst K and the number of repeated bursts within a group R_1 are both configurable, and their product is within the maximum number of potential SS/PBCH block locations predefined within the time-domain unit containing the group of repeated bursts.

In one embodiment, the R_2 repeated groups starts from the first slot within a period.

In one embodiment, the index of SSB within the time-domain unit is carried by the DMRS sequence of PBCH within the SSB, or a combination of the DMRS sequence of PBCH within the SSB and the content of PBCH within the SSB, depending on the carrier frequency range.

A UE can acquire the timing information within the time-domain unit by detecting the index of SSB within the time-domain unit.

In one embodiment, the index of group containing repeated burst of SSBs is carried by the content of PBCH within the SSB. A UE can acquire the timing information of the time-domain unit by detecting the index of group containing repeated burst of SSBs (e.g., same as the index of time-domain unit). For example, if the time-domain unit is a half frame, a UE can acquire the timing of half frame by detecting the index of group containing repeated burst of SSBs.

In one embodiment, the UE assumes the SSBs are QCLed, if the SSBs are with same value of mod (SSB index within the time-domain unit, K). For one example, if K is smaller or equal to 8, and dividable by 8 (e.g., from 1, 2, 4, 8), then mod(SSB index within the time-domain unit, K) is the same as mod(index of DMRS sequence of PBCH, K).

In one embodiment, in RRM measurement, the UE assumes the SSBs within a SMTC window and/or across SMTC windows are QCLed, if the SSBs are with same value of mod(SSB index within the time-domain unit, K_2), wherein K_2 is configured to the UE in the measurement object for acquiring the QCL assumption. In one example, for serving cell measurement, K_2 can be the same as K. In another example, K_2 can be configured separately for serving cell measurement and neighboring cell measurement. In yet another example, K_2 can be configured per each cell to measure. In yet another example, if K_2 is not configured, the UE can assume a default value (e.g., as 1).

In one embodiment, the UE assumes the information, other than part of the timing related information, carried by the physical layer signal/channel in the SSBs is the same for the SS/PBCH blocks with same index within the repeated burst, e.g., at least the MIB carried in PBCH in the SSBs.

In a third time-domain repetition pattern (e.g., time-domain repetition pattern 3), the SS/PBCH block burst set, which is transmitted periodically, includes N groups (e.g., N is an integer and N≥1), wherein each of the N groups further includes K bursts (e.g., K is an integer and K≥1), and each burst includes one or multiple repeated SSBs.

Figure 19:
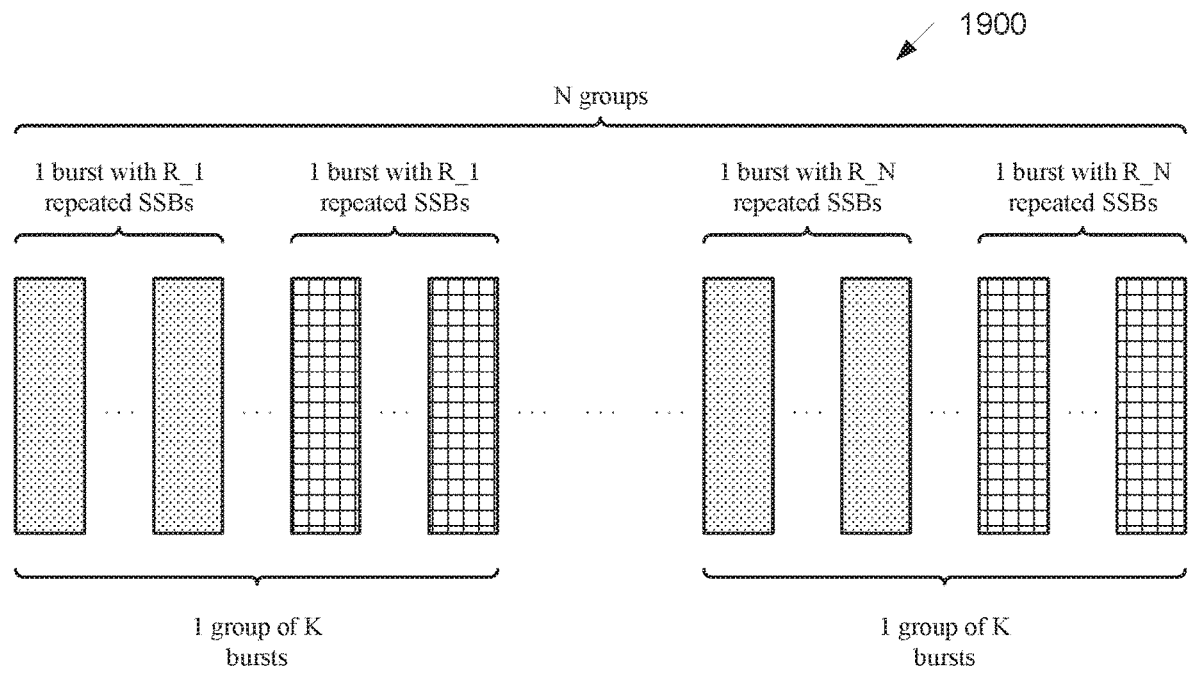
FIG. 19 illustrates an example third time-domain repetition pattern according to embodiments of the present disclosure.

In this time-domain repetition pattern, the UE assumes the SSBs with the same burst index in a group, and SSBs with same burst index within the repeated groups are QCLed. An illustration of the Time-Domain Repetition Pattern 3 is shown in FIG. 19. Note that the illustration in FIG. 19 only describes the relative time-domain locations among SSBs and the QCL assumption, and the potential time-domain gaps between SSBs are not illustrated explicitly.

FIG. 19 illustrates an example third time-domain repetition pattern 1900 according to embodiments of the present disclosure. An embodiment of the third time-domain repetition pattern 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

In one embodiment, the number of repeated SSBs within a burst for different groups may or may not be the same (e.g., R_1, R_N may or may not be the same).

In one embodiment, the time-domain repetition pattern 3 is same as the time-domain repetition pattern 1 if N=1.

In one embodiment, the group index is carried by the content of PBCH within the SSB. The UE assumes the information, other than part of the timing related information, carried by the physical layer signal/channel in the SSBs is the same for the SS/PBCH blocks within a group e.g., at least the MIB carried in PBCH in the SSBs.

In a fourth time-domain repetition pattern (e.g., time-domain repetition pattern 4), the SS/PBCH block burst set, which is transmitted periodically, includes N groups (e.g., N is an integer and N≥1), wherein each of the N groups further includes R repeated bursts (e.g., R is an integer and R≥1), and each burst includes one or multiple SSBs.

Figure 20:
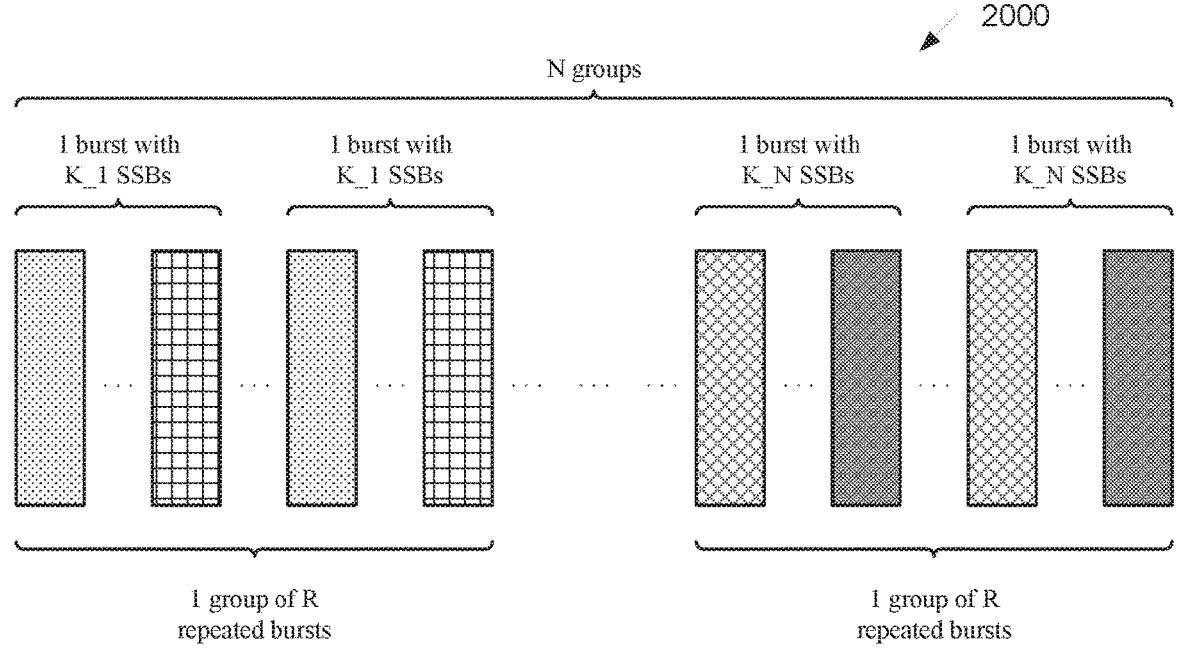
FIG. 20 illustrates an example fourth time-domain repetition pattern according to embodiments of the present disclosure.

In this time-domain repetition pattern, the UE assumes the SSBs with the same index within a burst corresponding to the same group are QCLed. An illustration of the time-domain repetition pattern 4 is shown in FIG. 20. Note that the illustration in FIG. 20 only describes the relative time-domain locations among SSBs and the QCL assumption, and the potential time-domain gaps between SSBs are not illustrated explicitly.

FIG. 20 illustrates an example fourth time-domain repetition pattern 2000 according to embodiments of the present disclosure. An embodiment of the fourth time-domain repetition pattern 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

In one embodiment, the UE assumes the information, other than part of the timing related information, carried by the physical layer signal/channel in the SSBs is the same for the SS/PBCH blocks with the same index within a burst corresponding to the same group, e.g., at least the MIB carried in PBCH in the SSBs.

In one embodiment, the number of SSBs within a burst for different groups may or may not be the same (e.g., K_1, K_N may or may not be the same).

In one embodiment, the time-domain repetition pattern 4 is same as the time-domain repetition pattern 2 if N=1.

SS/PBCH blocks (SSBs) can be enhancement with a frequency-domain hopping to enhance coverage. Note that the enhancement using the frequency-domain hopping can be combined with the repetition enhancement in time domain.

In one embodiment of frequency-domain hopping, a UE assumes that the lowest RB of the SSB changes/hops in frequency domain after each transmission of one or more SS/PBCH burst.

In one embodiment, the lowest RB of the SSB in the i-th burst (e.g., denoted as nRB_i) can be determined based on the lowest RB of the SSB in the previous burst (e.g., denoted as nRB_(i−1)). For example, nRB_i=nRB_(i−1)+c_0, where c_0 is a frequency domain hopping interval in terms of number of RBs between two consecutive SS/PBCH bursts. c_0 can be either defined in the specification of system operation, for example, 20 RBs, or provided to the UE through higher layer signaling.

In one embodiment, the UE assumes the information, other than part of the timing related information, carried by the physical layer signal/channel in the SSBs is the same for the SS/PBCH blocks with the same lowest RB, e.g., at least the MIB carried in PBCH in the SSBs.

In one embodiment of frequency-domain hopping, a UE assumes that the lowest RB of the SSB changes/hops in frequency domain after each transmission of one or more groups of SS/PBCH bursts, as described in the embodiments of this disclosure.

In one embodiment, the lowest RB of the SSB in the i-th group of bursts (e.g., denoted as nRB_i) can be determined based on the lowest RB of the SSB in the previous group of bursts (e.g., denoted as nRB_(i−1)). For example, nRB_i=nRB_(i−1)+c_0, where c_0 is a frequency domain hopping interval in terms of number of RBs between two consecutive SS/PBCH bursts. c_0 can be either defined in the specification of system operation, for example, 20 RBs, or provided to the UE through higher layer signaling.

In one embodiment, the UE assumes the information, other than part of the timing related information, carried by the physical layer signal/channel in the SSBs is the same for the SS/PBCH blocks with the same lowest RB, e.g., at least the MIB carried in PBCH in the SSBs.

SS/PBCH blocks (SSBs) can be repeated in frequency-domain for coverage enhancement or coverage recovery for low cost UEs, wherein in one example, repeated SSBs refer to the SSBs with QCL assumption from the UE point of view, and the signals and/or message carried by channels in the repeated SSBs may or may not be the same as the original SSB.

In one embodiment, the frequency-domain repetition can be combined with time-domain repetition. For example, at least one time-domain repetition pattern described in this disclosure can be combined with at least one frequency-domain repetition pattern described in this disclosure.

In one embodiment, the frequency-domain repetition enhancement only applies to the carrier with wide bandwidth, such that multiple transmission of SSBs at the same time instance within the carrier bandwidth is possible.

In a first frequency-domain repetition pattern (e.g., frequency-domain repetition pattern 1), the SS/PBCH block burst set, which is transmitted periodically, includes R bursts (e.g., R is an integer and R≥1) in the frequency domain (e.g., each burst located on a separate frequency layer), wherein each of the R repeated bursts further includes K SS/PBCH blocks (e.g., K is an integer and K≥1) in time domain.

Figure 21:
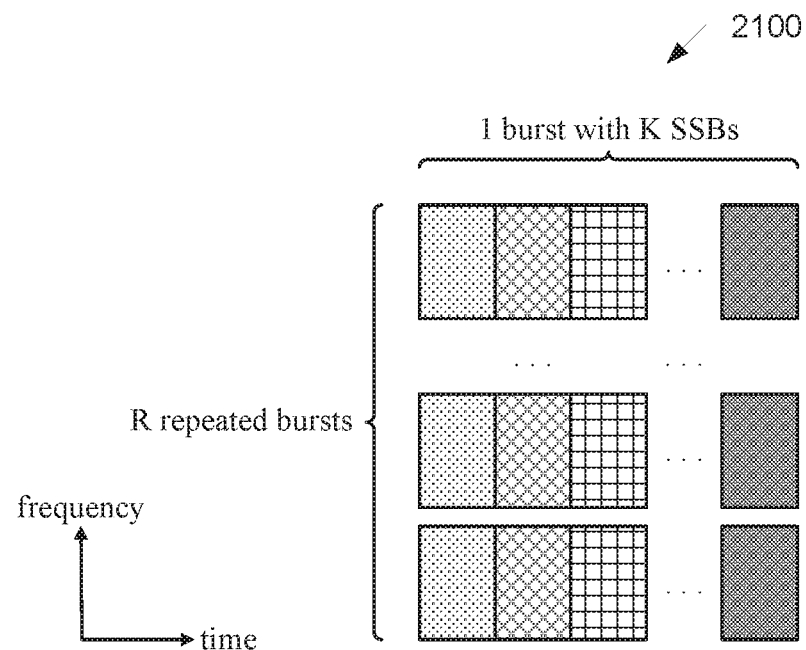
FIG. 21 illustrates an example first frequency-domain repetition pattern according to embodiments of the present disclosure.

In this frequency-domain repetition pattern, the UE assumes the SSBs on different frequency layers but with same time instance (e.g., same SS/PBCH bock index) are QCLed. An illustration of the frequency-domain repetition pattern 1 is shown in FIG. 21. Note that the illustration in FIG. 21 only describes the relative time-domain and frequency-domain locations among SSBs and the QCL assumption, and the potential time-domain and/or frequency-domain gaps between SSBs are not illustrated explicitly.

FIG. 21 illustrates an example first frequency-domain repetition pattern 2100 according to embodiments of the present disclosure. An embodiment of the first frequency-domain repetition pattern 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

In one embodiment for the frequency-domain repetition pattern 1, the R repeated bursts of SSBs do not overlap in frequency domain.

In one embodiment for the frequency-domain repetition pattern 1, at least one of the R repeated bursts of SSBs is located on a synchronization raster entry. For one example, only one burst of the R repeated bursts of SSBs is located on a synchronization raster entry, and all the rest bursts within the R repeated bursts of SSBs may not have to be located on synchronization raster entries, then a UE could at least detect the one burst of SSBs located on the synchronization raster entry for initial access.

In one embodiment the frequency-domain repetition pattern 1, the frequency domain gap between two neighboring bursts of SSBs is fixed. For one example, the gap is fixed as 0 RB (e.g., no gap).

In one embodiment for the frequency-domain repetition pattern 1, the number of repeated bursts R is configurable. In one example, R is indicated in system information, e.g., MIB or RMSI. In another example, R is indicated in RRC parameter, e.g., for measurement purpose.

In one embodiment for the frequency-domain repetition pattern 1, a UE is able to determine the cell ID carried by the burst of SSBs on the other frequency layers after detecting the cell ID carried by one SSB. In one example, the cell ID carried by the R repeated bursts of SSBs is the same. In another example, there is a deterministic relationship among the cell IDs carried by the R repeated bursts of SSBs, e.g., consecutive values.

In one embodiment for the frequency-domain repetition pattern 1, a UE is able to determine the burst index within the R bursts. In one example, the cell ID can carry the burst index, if there is a deterministic relationship among the cell IDs carried by the R repeated bursts of SSBs, e.g., consecutive values. In another example, there is an explicit indication of the burst index, e.g., in MIB or SIB.

In one embodiment for the frequency-domain repetition pattern 1, a UE assumes the actually transmitted SSBs within a burst is the same for the R repeated bursts.

In a second frequency-domain repetition pattern (e.g., frequency-domain repetition pattern 2), the SS/PBCH block burst set, which is transmitted periodically, includes R bursts (e.g., R is an integer and R≥1) in the frequency domain (e.g., each burst located on a separate frequency layer), wherein each of the R bursts further includes K SS/PBCH blocks (e.g., K is an integer and K≥1) in time domain, and each burst is a time-domain wrapped-around shift of the another burst.

Figure 22:
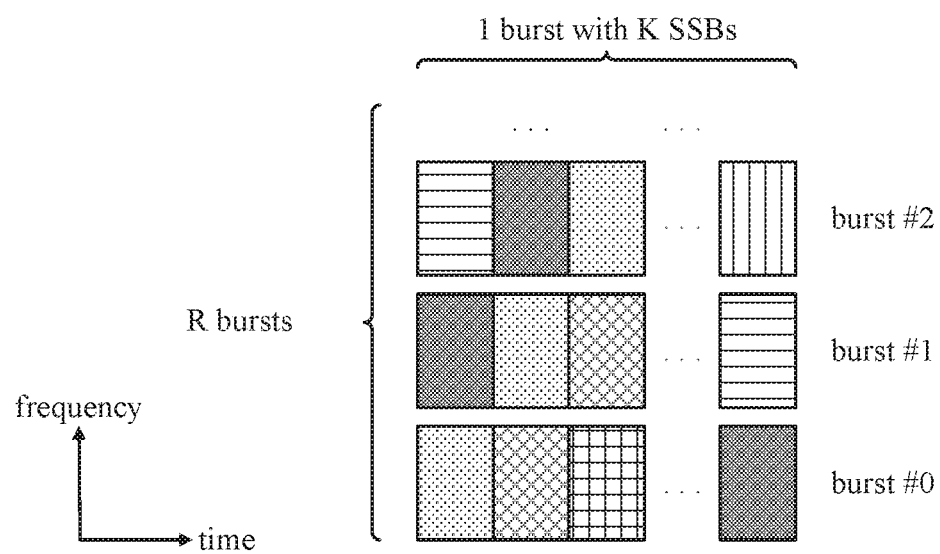
FIG. 22 illustrates an example second frequency-domain repetition pattern according to embodiments of the present disclosure.

An illustration of the frequency-domain repetition pattern 2 is shown in FIG. 22. Note that the illustration in FIG. 22 only describes the relative time-domain and frequency-domain locations among SSBs and the QCL assumption, and the potential time-domain and/or frequency-domain gaps between SSBs are not illustrated explicitly.

FIG. 22 illustrates an example second frequency-domain repetition pattern 2200 according to embodiments of the present disclosure. An embodiment of the second frequency-domain repetition pattern 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

In one aspect for the frequency-domain repetition pattern 2, the R repeated bursts of SSBs do not overlap in frequency domain.

In one embodiment for the frequency-domain repetition pattern 2, at least one of the R repeated bursts of SSBs is located on a synchronization raster entry. For one example, only one burst of the R repeated bursts of SSBs is located on a synchronization raster entry, and all the rest bursts within the R repeated bursts of SSBs may not have to be located on synchronization raster entries, then a UE could at least detect the one burst of SSBs located on the synchronization raster entry for initial access.

In one embodiment for the frequency-domain repetition pattern 2, the frequency domain gap between two neighboring bursts of SSBs is fixed. For one example, the gap is fixed as 0 RB (e.g., no gap).

In one embodiment for the frequency-domain repetition pattern 2, the number of repeated bursts R is configurable. In one example, R is indicated in system information, e.g., MIB or RMSI. In another example, R is indicated in RRC parameter, e.g., for measurement purpose.

In one embodiment for the frequency-domain repetition pattern 2, a UE is able to determine the cell ID carried by the burst of SSBs on the other frequency layers after detecting the cell ID carried by one SSB. In one example, the cell ID carried by the R repeated bursts of SSBs is the same. In another example, there is a deterministic relationship among the cell IDs carried by the R repeated bursts of SSBs, e.g., consecutive values.

In one embodiment for the frequency-domain repetition pattern 2, a UE is able to determine the burst index within the R bursts. In example, the cell ID can carry the burst index, if there is a deterministic relationship among the cell IDs carried by the R repeated bursts of SSBs, e.g., consecutive values. In another example, there is an explicit indication of the burst index, e.g., in MIB or SIB.

In one embodiment for the frequency-domain repetition pattern 2, a time-domain wrapped-around shift can be based on the bust index. For example, the burst #i is time-domain wrapped-around shift by (i-j) SSBs from burst #j.

In one embodiment for the frequency-domain repetition pattern 2, a UE assumes the X-th SSB within burst #i is QCLed with the Y-th SSB within burst #j, if (X−i) mod K=(Y−j) mod K.

In one embodiment for the frequency-domain repetition pattern 2, from a UE point of view, the transmission of a set of QCLed SSBs are frequency-hopping according to a predefined pattern, e.g., hopping in frequency domain with a wrapped-around shift.

In one embodiment for the frequency-domain repetition pattern 2, a UE can determine an SSB index from the detected SSB. For one example, the SSB index is defined the same as NR Rel-15 and is determined based on the DMRS sequence of PBCH or the combination of DMRS sequence of PBCH and the content of PBCH, according to the frequency range.

For another example, the SSB index is defined as the potential SSB location index within a burst, and it can be determined using the DMRS sequence of PBCH or the combination of DMRS sequence of PBCH and the content of PBCH (according to the frequency range), as well as the burst index or wrapped-around shift value.

For yet another example, the SSB index is defined as the potential SSB location index within a burst, and it can be determined using the DMRS sequence of PBCH or the combination of DMRS sequence of PBCH and the content of PBCH (according to the frequency range), wherein the range of the index can be exceeding the one in NR Rel-15.

In one embodiment for the frequency-domain repetition pattern 2, a UE assumes the actually transmitted SSBs within a burst is the same for the R repeated bursts.

In one embodiment for the frequency-domain repetition pattern 2, a UE assumes the actually transmitted SSBs within a burst is the same as the ones within another burst, but with a wrapped-around shift.

PBCH is used to deliver MIB to UEs within the serving cell. MIB indicates a configuration of a Control Resource Set (CORESET) #0 for scheduling transmission of Remaining Minimum System Information (RMSI), paging, and PRACH configuration. A PRB-level offset between Synchronization Signal (SS)/PBCH block and CORESET #0 is jointly coded with multiplexing pattern, CORESET #0 bandwidth (BW), and the number of OFDM symbols of the CORESET #0 using 4 bits of MIB, and the parameters for monitor window of common search space in the CORESET #0 are also jointly coded using another 4 bits of MIB. An illustration of the three supported multiplexing patterns of SS/PBCH block and CORESET/PDSCH are illustrated in 2301, 2302, and 2303 in FIG. 23.

Figure 23:
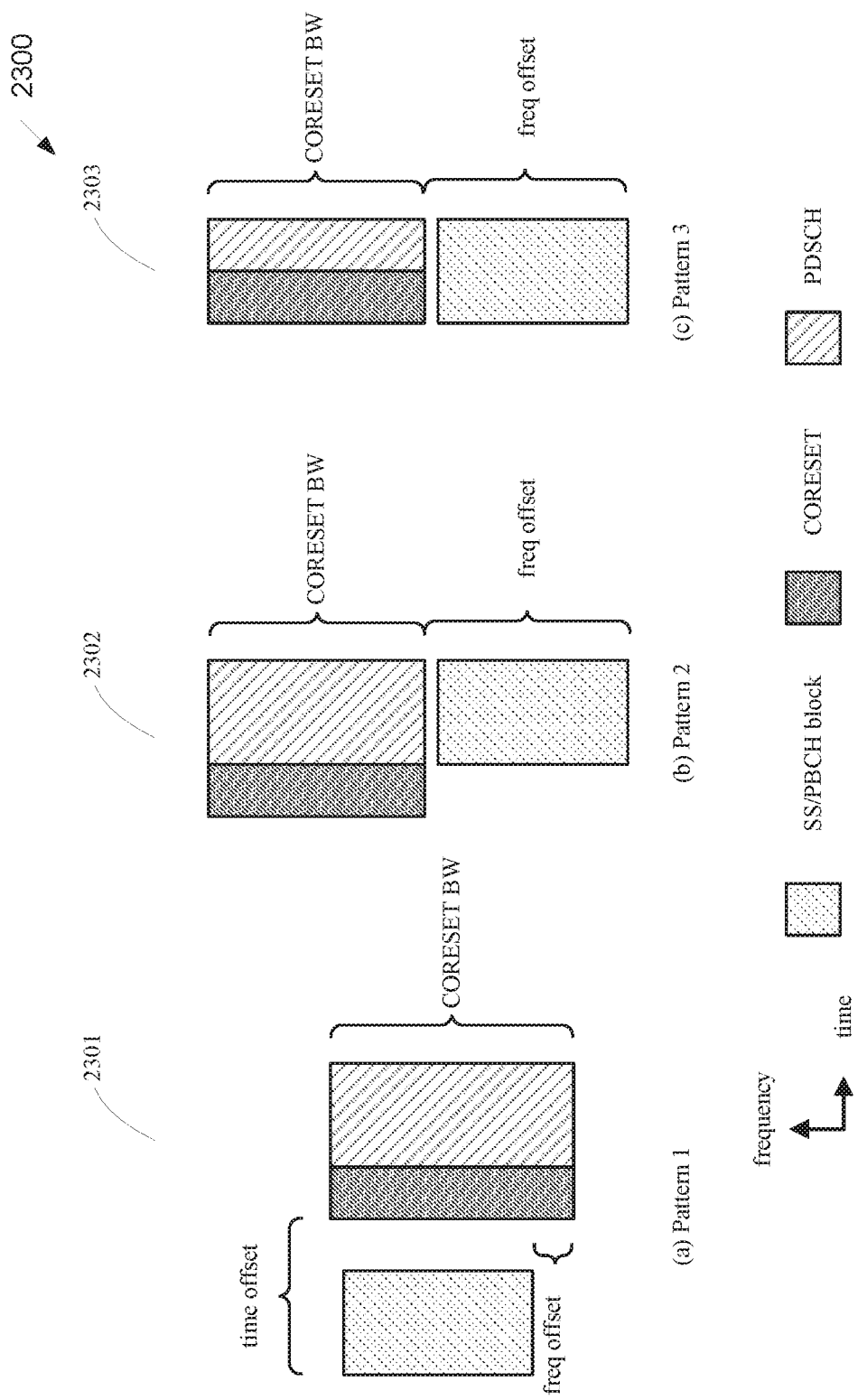
FIG. 23 illustrates an example multiplexing pattern according to embodiments of the present disclosure.

FIG. 23 illustrates an example multiplexing pattern 2300 according to embodiments of the present disclosure. An embodiment of the multiplexing pattern 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

An NR system is intended to support multiple traffic types, including eMBB, eURLLC and mMTC. Unlike eMBB or eURLLC for high-end UEs, mMTC type traffic mainly comes from services for mid-tier or low tier UEs with reduced cost, such as reduced TX/RX antennas, reduced operation BW. The coverage requirement for eMTC based service, such as indoor industrial sensors, video surveillance, and smart watches, can be either same as eMBB or even higher than eMBB, However, current SS/PBCH block developed since NR Rel-15 only address the requirements for high-end UE with eMBB or eURLLC traffic. Therefore, enhancement of SS/PBCH design need to be considered to address many initial access related issues for mid-tier or low tier UEs.

One issue is how to deliver additional master information other than the MIB in NR Rel-15 PBCH to assist the initial access of low cost UEs. For NR Rel-15 PBCH, there are three and one reserved bit(s) in the content of PBCH for FR1 and FR2, respectively. However, the reserved bits may not be enough to indicate additional master information for low cost UEs, such as configuration of dedicated CORESET #0 with reduced BW.

Another issue is coverage recovery or enhancement for the reception of SS/PBCH block. For a low-cost UE, the UE is expected to have performance loss on synchronization, cell search, and PBCH detection due to reduced number of antennas for SS/PBCH block reception. The coverage recovery or enhancement may be backward compatible and transparent to regular UEs that only monitor NR Rel-15 SS/PBCH blocks.

Therefore, there is a need to consider additional physical layer signal/channel to deliver the additional master information dedicated to UEs operate with reduced cost, such as reduced operation BW, a number of antennas, and low power consumption.

There is another need to consider modification of NR Rel-15 SS/PBCH block to indicate dedicated SS/PBCH block to UEs operate with reduced cost, such as reduced operation BW, number of antennas, and low power consumption.

The present disclosure relates to a pre-5th-Generation (5G) or 5G communication system to be provided for supporting higher data rates beyond 4th-generation (4G) communication system such as long term evolution (LTE). The disclosure relates to determine additional physical layer signal(s) multiplexed with SS/PBCH block transmitted from a serving gNB to UEs operate with reduced cost, such as reduced UE operation BW. The disclosure also relates to determine modification of NR Rel-15 SS/PBCH block (SSB) which is transmitted from a serving gNB to UEs operate with reduced cost, such as reduced UE operation BW. The disclosure further relates to determine additional PBCH multiplexed with NR Rel-15 SS/PBCH block transmitted from a serving gNB to UEs operate with reduced cost, such as reduced UE operation BW.

This disclosure considers SS/PBCH enhancement, which is applicable at least to UEs operate with reduced cost, such as reduced UE operation BW, for example 5 MHz at FR1 and 20 MHz at FR2; or reduced number of antenna, for example 1 antenna for UL/DL; or reduced power consumption, for example, 1 year battery lifetime. This type of UEs is referred as NR-light UE in this disclosure.

Figure 24:
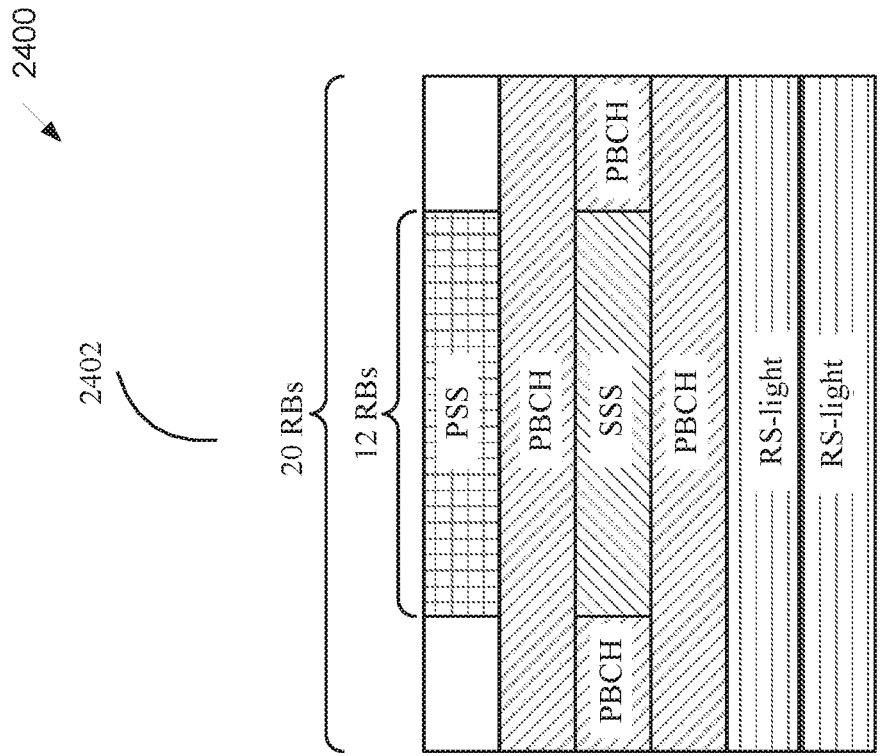
FIG. 24 illustrates an example enhancement of SS/PBCH block with additional physical layer signal according to embodiments of the present disclosure.
Figure 24:
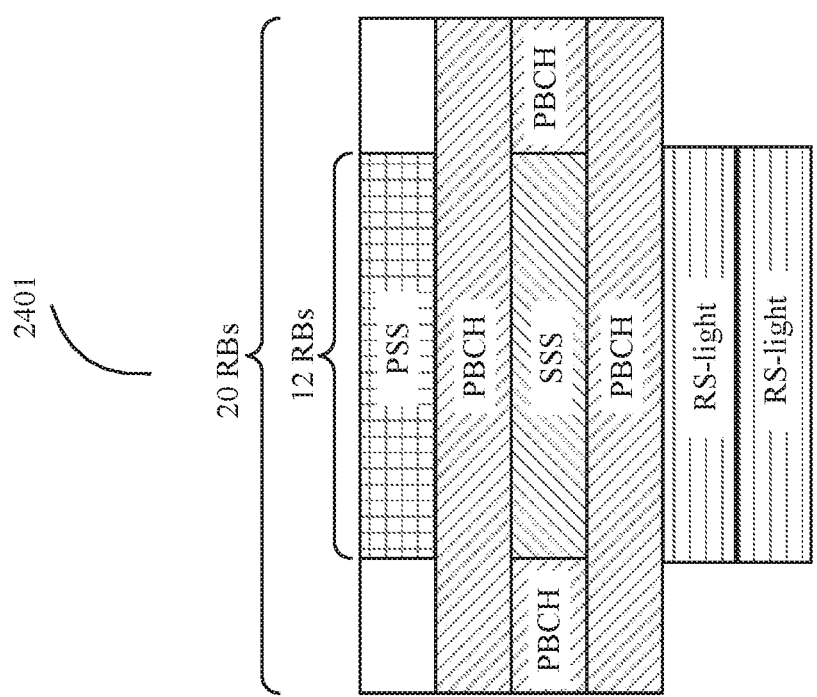

In one embodiment, one or more additional physical layer signal(s) multiplexed with SS/PBCH block transmitted from a serving gNB to at least NR-light UEs are provided as illustrated in FIG. 24. The additional physical layer signal(s) can be referred to RS-light in this disclosure, which can also be referred to other equivalent terminologies, such as enhanced synchronization signal (eSS), synchronization signal-light (SS-light), or wake-up-signal (WUS).

FIG. 24 illustrates an example enhancement of SS/PBCH block with additional physical layer signal 2400 according to embodiments of the present disclosure. An embodiment of the enhancement of SS/PBCH block with additional physical layer signal 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

In one embodiment, a UE assumes there is a one to one association between a SS/PBCH block and a RS-light transmission, and the antenna port for a RS-light reception is QCLed with the associated SS/PBCH block.

In one embodiment, a UE assumes there is a one to one association between a SS/PBCH block and a RS-light transmission, and the antenna port for transmitting a SS/PBCH block and the associated RS-light is the same.

For the bandwidth of RS-light in terms of number of RBs (denoted as N^RS-light_RB), a UE can determine N^RS-light_RB through any of the following.

In one example, the UE assumes N^RS-light_RB is 20RB, which is same as the BW of associated SS/PBCH block. One illustration is shown in 2402 of FIG. 24.

In another example, the UE assumes N^RS-light_RB is 12RB, which is same as the BW of SSS or PSS. One illustration is shown in 2401 of FIG. 24.

In yet another example, N^RS-light_RB is predetermined in the specification.

RS-light can be used to carry information that is needed during SS/PBCH reception in initial access for at least NR-light UEs. The information carried by RS-light can be at least one of the following.

In one example, the information carried in RS-light is cell ID, such that the signal of RS-light is cell-specific.

In another example, the information carried in RS-light is a configuration of a CORESET dedicated at least to NR-light UEs, where the UE is expected to at least monitor Type0-PDCCH CSS for DCI formats with CRC scrambled by SI-RNTI in a CSS set associated with the CORESET. This type of information is referred as I_CORESET0.

In yet another example, the information carried in RS-light is a configuration of a search space set, wherein NR-light UEs monitor PDCCH in the search space set according to a common search space set for at least DCI format with CRC scrambled by SI-RNTI. In one sub-example, the search space set can be Type0-PDCCH CSS set dedicated to NR-light UEs. This type of information is referred as I_CSS0.

In yet another example, the information carried in RS-light is the grant of PDSCH for the transmission of system information dedicated at least to NR-light UEs. This type of information is referred as I_RMSI. The grant of PDSCH includes configuration parameters to indicate the configuration of the PDSCH.

In yet another example, the information carried in RS-light can be timing information, denoted as I_t; I_t can be associated with the slot index, n_s, or OFDM symbol index, n_OS. For example, I_t=n_s*14+n_OS; I_t can also be the SSB index.

In yet another example, the information carried in RS-light can be an indication to indicate whether or not to receive/monitor PDCCH in one or more PDCCH monitoring occasion(s) associated with a paging occasion for a DCI format with CRC scrambled by P-RNTI.

In yet another example, the information carried in RS-light can be an access baring indication to indicate whether or not NR-light UEs can access the cell.

For the time domain resources assignment of RS-light, the RS-light can be mapped into the available OFDM symbols other than those mapped for SS/PBCH blocks in a SS/PBCH transmission burst. In this case, the RS-light is multiplexed with an SS/PBCH block in time domain. A UE can assume any of the following for the time resources in terms of OFDM symbols for RS-light.

In one example, the RS-light can be mapped into one or two available OFDM symbols after the associated SS/PBCH block, that is not occupied by other SS/PBCH block(s) or other RS-light(s).

In another example, the RS-light can be mapped into one or two available OFDM symbols before the associated SS/PBCH block, that is not occupied by other SS/PBCH block(s) or other RS-light(s). In one sub-example, a last symbol of the RS-light is located at a first symbol before the SS/PBCH block. In another sub-example, a last symbol of the RS-light is located at a first symbol of the SS/PBCH block, wherein the RS-light is mapped into a set of resources elements (REs) excluding REs occupied by any SS/PBCH block.

Figure 25:
FIG. 25 illustrates an example time domain resources assignment of RS-light according to embodiments of the present disclosure.
Figure 25:

FIG. 25 illustrates an example time domain resources assignment of RS-light 2500 according to embodiments of the present disclosure. An embodiment of the time domain resources assignment of RS-light 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

FIG. 25 illustrates an example of time domain resources for RS-light, where RS-light is mapped into two OFDM symbols.

For SS/PBCH SCS of 15 KHz, RS-light is mapped into the next two consecutive OFDM symbols after the associated SS/PBCH block in the same slot, such that: an OFDM symbol with index 6 and 7 are for RS-light associated with a SS/PBCH block in OFDM symbols #2-5 in the same slot; and an OFDM symbol with index 12 and 13 are for RS-light associated with a SS/PBCH block in OFDM symbols #8-11 in the same slot.

For SS/PBCH SCS of 30 KHz Pattern 1, RS-light is mapped into either the two consecutive OFDM symbols before a SS/PBCH block or next two consecutive OFDM symbols after a SS/PBCH block in the same slot, such that: an OFDM symbol with index 2 and 3 are for RS-light associated with a SS/PBCH block in OFDM symbols #4-7 in the same slot; an OFDM symbol with index 12 and 13 are for RS-light associated with a SS/PBCH block in OFDM symbols #8-11 in the same slot; an OFDM symbol with index 10 and 11 are for RS-light associated with a SS/PBCH block in OFDM symbols #2-5 in the same slot; and an OFDM symbol with index 12 and 13 are for RS-light associated with a SS/PBCH block in OFDM symbols #6-9 in the same slot.

For SS/PBCH SCS of 30 KHz Pattern 2, RS-light is mapped into the next two consecutive OFDM symbols after the associated SS/PBCH block in the same slot, such that: an OFDM symbol with index 6 and 7 are for RS-light associated with a SS/PBCH block in OFDM symbols #2-5; and an OFDM symbol with index 12 and 13 are for RS-light associated with a SS/PBCH block in OFDM symbols #8-11.

For SS/PBCH SCS of 120 KHz, RS-light is mapped into either the two consecutive OFDM symbols before a SS/PBCH block or next two consecutive OFDM symbols after a SS/PBCH block in the same slot, such that: an OFDM symbol with index 2 and 3 are for RS-light associated with a SS/PBCH block in OFDM symbols #4-7 in the same slot; an OFDM symbol with index 12 and 13 are for RS-light associated with a SS/PBCH block in OFDM symbols #8-11 in the same slot; an OFDM symbol with index 10 and 11 are for RS-light associated with a SS/PBCH block in OFDM symbols #2-5 in the same slot; and an OFDM symbol with index 12 and 13 are for RS-light associated with a SS/PBCH block in OFDM symbols #6-9 in the same slot.

For SS/PBCH SCS of 240 KHz, RS-light is mapped into two consecutive OFDM symbols either before or after a SS/PBCH block in the same slot or previous slot or next slot, such that: OFDM symbols with index 4 and 5 are for RS-light associated with a SS/PBCH block in OFDM symbols #8-11 in the same slot; OFDM symbols with index 6 and 7 are for RS-light associated with a SS/PBCH block in OFDM symbols #12-13 in the same slot and #0-1 in next slot; an OFDM symbol with index 10 and 11 are for RS-light associated with a SS/PBCH block in OFDM symbols #2-5 in the same slot; an OFDM symbol with index 12 and 13 are for RS-light associated with a SS/PBCH block in OFDM symbols #6-9 in the same slot; an OFDM symbol with index 6 and 7 are for RS-light associated with a SS/PBCH block in OFDM symbols #4-7 in the previous slot; an OFDM symbol with index 8 and 9 are for RS-light associated with a SS/PBCH block in OFDM symbols #8-11 in the previous slot; an OFDM symbol with index 10 and 11 are for RS-light associated with SS/PBCH block in OFDM symbols #12-13 in the previous slot and #0-1 in the same slot; and an OFDM symbol with index 12 and 13 are for RS-light associated with SS/PBCH block in OFDM symbols #2-5 in the same slot.

Figure 26:
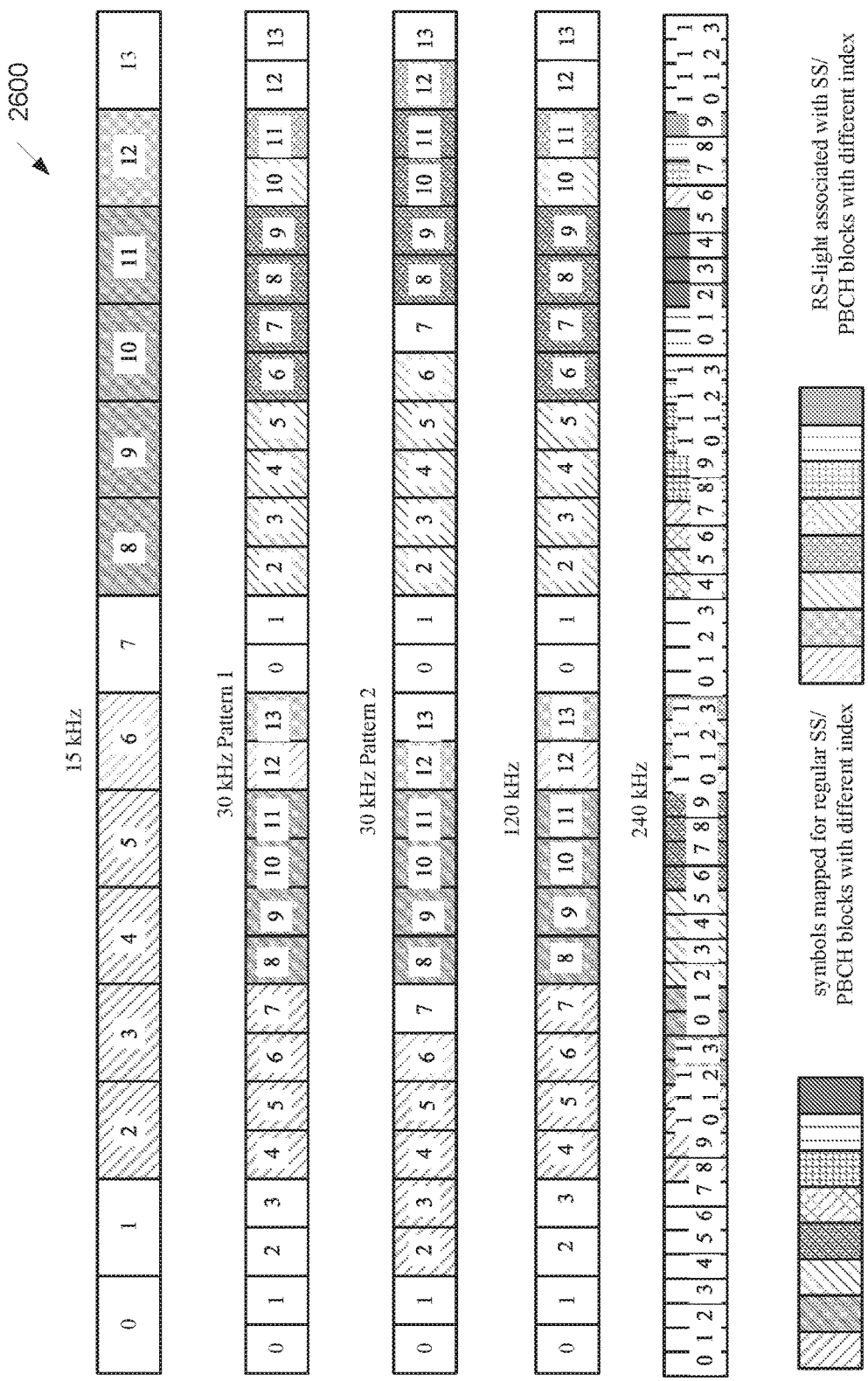
FIG. 26 illustrates another example time domain resources assignment of RS-light according to embodiments of the present disclosure.

FIG. 26 illustrates another example time domain resources assignment of RS-light 2600 according to embodiments of the present disclosure. An embodiment of the time domain resources assignment of RS-light 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

FIG. 26 illustrates another example of time domain resource for RS-light, where RS-light is mapped into one OFDM symbol.

For SS/PBCH SCS of 15 KHz, RS-light is mapped into the next OFDM symbol after the associated SS/PBCH block in the same slot, such that: an OFDM symbol with index 6 is for RS-light associated with a SS/PBCH block in OFDM symbols #2-5 in the same slot; and an OFDM symbol with index 12 is for RS-light associated with a SS/PBCH block in OFDM symbols #8-11 in the same slot.

For SS/PBCH SCS of 30 KHz Pattern 1, RS-light is mapped into one OFDM symbol before or after a SS/PBCH block in the same slot, such that: an OFDM symbol with index 2 is for RS-light associated with a SS/PBCH block in OFDM symbols #4-7 in the same slot; an OFDM symbol with index 3 is for RS-light associated with a SS/PBCH block in OFDM symbols #8-11 in the same slot; an OFDM symbol with index 10 is for RS-light associated with a SS/PBCH block in OFDM symbols #2-5 in the same slot; and an OFDM symbol with index 13 is for RS-light associated with a SS/PBCH block in OFDM symbols #6-9 in the same slot.

For SS/PBCH SCS of 30 KHz Pattern 2, RS-light is mapped into the next OFDM symbol after the associated SS/PBCH block in the same slot, such that: an OFDM symbol with index 6 is for RS-light associated with a SS/PBCH block in OFDM symbols #2-5 in the same slot; and an OFDM symbol with index 12 is for RS-light associated with a SS/PBCH block in OFDM symbols #8-11 in the same slot.

For SS/PBCH SCS of 120 KHz, RS-light is mapped into either an OFDM symbol before a SS/PBCH block or an OFDM symbol after a SS/PBCH block in the same slot, such that: an OFDM symbol with index 2 is for RS-light associated with a SS/PBCH block in OFDM symbols #4-7 in the same slot; an OFDM symbol with index 3 is for RS-light associated with a SS/PBCH block in OFDM symbols #8-11 in the same slot; an OFDM symbol with index 10 is for RS-light associated with a SS/PBCH block in OFDM symbols #2-5 in the same slot; and an OFDM symbol with index 11 is for RS-light associated with a SS/PBCH block in OFDM symbols #6-9 in the same slot.

For SS/PBCH SCS of 240 KHz, RS-light is mapped into an OFDM symbol either before or after a SS/PBCH block in the same slot or previous slot or next slot, such that: OFDM symbols with index 6 is for RS-light associated with a SS/PBCH block in OFDM symbols #8-11 in the same slot; OFDM symbols with index 7 is for RS-light associated with a SS/PBCH block in OFDM symbols #12-13 in the previous slot and #0-1 in next slot; an OFDM symbol with index 10 is for RS-light associated with a SS/PBCH block in OFDM symbols #2-5 in the same slot; an OFDM symbol with index 11 is for RS-light associated with a SS/PBCH block in OFDM symbols #6-9 in the same slot; an OFDM symbol with index 6 is for RS-light associated with a SS/PBCH block in OFDM symbols #4-7 in the previous slot; an OFDM symbol with index 7 is for RS-light associated with a SS/PBCH block in OFDM symbols #8-11 in the previous slot; an OFDM symbol with index 8 is for RS-light associated with SS/PBCH block in OFDM symbols #12-13 in the previous slot and #0-1 in the same slot; and an OFDM symbol with index 9 is for RS-light associated with SS/PBCH block in OFDM symbols #2-5 in the same slot.

In one embodiment, when more than one OFDM symbols are available for RS-light, RS-light can be repeated. For example, when two OFDMs symbols are assigned for RS-light, a UE assumes RS-light is mapped per OFDM symbol and repeated in the two OFDM symbols.

For the smallest RB index of RS-light RBs (denoted as n_startRB), a UE can determine n_startRB through any of the following.

In one example, the UE assumes n_startRB is same as the smallest RB of the associated SS/PBCH block.

In another example, the UE assumes that n_startRB is same as the smallest RB of PSS or SSS in the associated SS/PBCH block.

In yet another example, the UE assumes n_startRB is determined by an offset, i.e., O_RB, relative to the smallest RB index of associated SS/PBCH block, i.e., n^SSB_startRB. For example, n_startRB=n^SSB_startRB−O_RB or n_startRB=n^SSB_startRB+O_RB, where O_RB can be a positive or negative integer or zero. For example, O_RB=2 or 4.

For the construction or generation of RS-light, the RS-light can be a sequence, denoted as d_light(n), n=0, . . . , L_RS−1, where L_RS is the length of the sequence. The property of the sequence or sequence generation of d_light (n) can also be reused for determining the carried information, for example, to indicate whether or not a UE needs to wake up for next paging occasion in RRC_IDLE/INACTIVATED state. Alternatively, the absence or presence of RS-light can be used for determination of the carried information.

For the length of d_light(n), L_RS, a UE can determine L_RS through any of the following. In one example, the UE assumes that L_RS is 127. In another example, the UE assumes that L_RS is 240.

For mapping of the sequence of symbols d_light(n) into associated resources elements (REs), a UE can assume any of the following.

In one example, the UE assumes that the sequence of symbols d_light(n) are mapped into resource elements in the center of assigned RBs in increasing order of subcarrier index per assigned symbol.

In another example, the UE assumes that the sequence of symbols d_light(n) are mapped into resource elements in the center of assigned RBs and assigned symbols in increasing order of subcarrier index first and then symbol index.

In yet another example, the UE assumes that the sequence of symbols d_light(n) is mapped into assigned RBs with lowest N_SC subcarriers left as empty in increasing order of subcarrier index, per assigned OFDM symbol. N_SC is a non-negative integer, e.g., N_SC=8 or 0.

In yet another example, the UE assumes that the sequence of symbols d_light(n) is mapped into assigned RBs with lowest N_SC subcarriers left as empty in increasing order of subcarrier index and then OFDM symbol index. N_SC is a non-negative integer, e.g., N_SC=8 or 0.

In one embodiment, a sequence generation of d_light(n), d_light(n) can be constructed from a QPSK or BPSK modulated M-sequence, e.g., d_light(n) can be generated according to d_light (n)=(1−2*d_M((2n+m_M) mod L_RS))/√2+j*(1−2*d_M(2n+1+m_M) mod L_RS))/√2, if QPSK modulated, or d_light(n)=1−2*d_M((n+m_M) mod L_RS), if BPSK modulated, where L_RS is the length of M-sequence, and m_M is the cyclic shift applied to the M-sequence. Denote the generator of M-sequence as g_M (x), which can be determined based on the sequence length L_RS, and with a predefined initial condition.

Regarding the generator of M-sequence, g_M(x), and the cyclic shift of M-sequence, m_M.

In one example, only the generator of M-sequence carries information in RS-light, and cyclic shift can be predefined (e.g., m_M=0 for each generator, i.e., no cyclic shift).

In another example, only the cyclic shift of M-sequence carries information in RS-light, and generator can be predefined.

In yet another example, both the cyclic shift of M-sequence generator can carry part of the information in RS-light.

If L_RS=127, d_M(n) can be generated from construction method in TABLE 1 with proper initial condition e.g., $d_M(0)=d_M(1)=d_M(2)=d_M(3)=d_M(4)=d_M(5)=0$, $d_M(6)=1$, or $d_M(1)=d_M(2)=d_M(3)=d_M(4)=d_M(5)=d_M(6)=0$, $d_M(0)=1$.

In one example, the polynomial for generating the M-sequence can be $x^7+x+1$ for simplicity.

In another example, the polynomial for generating the M-sequence can be $x^7+x^3+1$ for simplicity.

In e yet another example, the polynomial for generating the M-sequence can be $x^7+x^6+1$ for simplicity.

In yet another example, the polynomial for generating the M-sequence can be $x^7+x^4+1$ for simplicity.

TABLE 1

| No. | Recursive construction method | Corresponding polynomial | Corresponding taps of register |
|---|---|---|---|
| 1 | $d_M(i+7) = [d_M(i+6) + d_M(i)]\bmod 2$, $0 \le i \le 119$ | $x^7 + x^6 + 1$ | [1, 7] |
| 2 | $d_M(i+7) = [d_M(i+1) + d_M(i)]\bmod 2$, $0 \le i \le 119$ | $x^7 + x + 1$ | [6, 7] |
| 3 | $d_M(i+7) = [d_M(i+4) + d_M(i)]\bmod 2$, $0 \le i \le 119$ | $x^7 + x^4 + 1$ | [3, 7] |
| 4 | $d_M(i+7) = [d_M(i+3) + d_M(i)]\bmod 2$, $0 \le i \le 119$ | $x^7 + x^3 + 1$ | [4, 7] |
| 5 | $d_M(i+7) = [d_M(i+6) + d_M(i+5) + d_M(i+4) + d_M(i)]\bmod 2$, $0 \le i \le 119$ | $x^7 + x^6 + x^5 + x^4 + 1$ | [1, 2, 3, 7] |
| 6 | $d_M(i+7) = [d_M(i+3) + d_M(i+2) + d_M(i+1) + d_M(i)]\bmod 2$, $0 \le i \le 119$ | $x^7 + x^3 + x^2 + x + 1$ | [4, 5, 6, 7] |
| 7 | $d_M(i+7) = [d_M(i+6) + d_M(i+5) + d_M(i+2) + d_M(i)]\bmod 2$, $0 \le i \le 119$ | $x^7 + x^6 + x^5 + x^2 + 1$ | [1, 2, 5, 7] |
| 8 | $d_M(i+7) = [d_M(i+5) + d_M(i+2) + d_M(i+1) + d_M(i)]\bmod 2$, $0 \le i \le 119$ | $x^7 + x^5 + x^2 + x + 1$ | [2, 5, 6, 7] |
| 9 | $d_M(i+7) = [d_M(i+5) + d_M(i+4) + d_M(i+3) + d_M(i)]\bmod 2$, $0 \le i \le 119$ | $x^7 + x^5 + x^4 + x^3 + 1$ | [2, 3, 4, 7] |
| 10 | $d_M(i+7) = [d_M(i+4) + d_M(i+3) + d_M(i+2) + d_M(i)]\bmod 2$, $0 \le i \le 119$ | $x^7 + x^4 + x^3 + x^2 + 1$ | [3, 4, 5, 7] |
| 11 | $d_M(i+7) = [d_M(i+6) + d_M(i+4) + d_M(i+2) + d_M(i)]\bmod 2$, $0 \le i \le 119$ | $x^7 + x^6 + x^4 + x^2 + 1$ | [1, 3, 5, 7] |
| 12 | $d_M(i+7) = [d_M(i+5) + d_M(i+3) + d_M(i+1) + d_M(i)]\bmod 2$, $0 \le i \le 119$ | $x^7 + x^5 + x^3 + x + 1$ | [2, 4, 6, 7] |
| 13 | $d_M(i+7) = [d_M(i+6) + d_M(i+4) + d_M(i+1) + d_M(i)]\bmod 2$, $0 \le i \le 119$ | $x^7 + x^6 + x^4 + x + 1$ | [1, 3, 6, 7] |
| 14 | $d_M(i+7) = [d_M(i+6) + d_M(i+3) + d_M(i+1) + d_M(i)]\bmod 2$, $0 \le i \le 119$ | $x^7 + x^6 + x^3 + x + 1$ | [1, 4, 6, 7] |
| 15 | $d_M(i+7) = [d_M(i+5) + d_M(i+4) + d_M(i+3) + d_M(i+2) + d_M(i+1) + d_M(i)]\bmod 2$, $0 \le i \le 119$ | $x^7 + x^5 + x^4 + x^3 + x^2 + x + 1$ | [2, 3, 4, 5, 6, 7] |
| 16 | $d_M(i+7) = [d_M(i+6) + d_M(i+5) + d_M(i+4) + d_M(i+3) + d_M(i+2) + d_M(i)]\bmod 2$, $0 \le i \le 119$ | $x^7 + x^6 + x^5 + x^4 + x^3 + x^2 + 1$ | [1, 2, 3, 4, 5, 7] |
| 17 | $d_M(i+7) = [d_M(i+6) + d_M(i+5) + d_M(i+3) + d_M(i+2) + d_M(i+1) + d_M(i)]\bmod 2$, $0 \le i \le 119$ | $x^7 + x^6 + x^5 + x^3 + x^2 + x + 1$ | [1, 2, 4, 5, 6, 7] |
| 18 | $d_M(i+7) = [d_M(i+6) + d_M(i+5) + d_M(i+4) + d_M(i+2) + d_M(i+1) + d_M(i)]\bmod 2$, $0 \le i \le 119$ | $x^7 + x^6 + x^5 + x^4 + x^2 + 1$ | [1, 2, 3, 5, 6, 7] |

In one embodiment, a sequence generation of d_light(n), d_light(n) can be constructed from a QPSK or BPSK modulated Gold-sequence, e.g., d_light(n) can be generated according to d_light (n)=(1−2*((s_M1((2n+m_M1) mod L_RS)+s_M2((2n+m_M2) mod L_RS)) mod 2))/√2+j*(1−2*((s_M1((2n+1+m_M1) mod L_RS)+s_M2((2n+1+m_M2) mod L_RS)) mod 2))/√2, if QPSK modulated, or d_light (n)=1−2*((d_M1((n+m_M1) mod L_RS)+d_M2((n+m_M2) mod L_RS)) mod 2), if BPSK modulated, where L_RS is the length of Gold-sequence, and m_M1 and m_M2 are the cyclic shifts applied to the each of the two M-sequences constructing the Gold-sequence, respectively. Denote the generator of the two M-sequences constructing the Gold-sequence as g_M1(x) and g_M2(x), respectively, which can be determined based on the sequence length L_RS, and with a predefined initial condition for each of the M-sequence.

Regarding the cyclic shifts of Gold-sequence m_M1 and m_M2; in one example, only of the cyclic shifts is utilized to carry information in RS-light (e.g., m_M1) and the other cyclic shift is fixed (e.g., m_M2=0, i.e., no cyclic shift); and in another example, both the cyclic shifts of Gold-sequence can carry part of the information in RS-light.

If L_RS=127, d_M1(n) and d_M2(n) can be generated from construction method in Table 1 with proper initial condition e.g., $d_M(0)=d_M(1)=d_M(2)=d_M(3)=d_M(4)=d_M(5)=0$, $d_M(6)=1$, or $d_M(1)=d_M(2)=d_M(3)=d_M(4)=d_M(5)=d_M(6)=0$, $d_M(0)=1$.

In one embodiment, a sequence generation of d_light(n), d_light(n) can be constructed from a low PAPR sequence as defined as d_light(n)=$e^{j\alpha n}\bar{r}_{u,v}(n)$, where u, and v are the group number and base sequence number with in the group, respectively.

Regarding the group number, u and base sequence number within the group, v: in one example, only the u is utilized to carry information in RS-light and v is fixed (e.g., v=0). In another example, both the u and v can carry part of the information in RS-light.

For the length of low PARA sequence-based d_light(n), in one example, L_RS=240.

In one embodiment, a sequence generation of d_light(n), d_light(n) can be a ZC sequence, e.g., d_light(n) can be generated according to $s(n)=c(m)*\exp(-j*2*\pi*\theta*n)*\exp(-j*\pi*u*n'*(n'+1))/L\_RS)$, $n=0, \ldots, L\_RS-1$ where c(m) is the potential cover code, $\theta$ is the potential phase shift of ZC-sequence, m_ZC is the potential cyclic shift of ZC-sequence, u is the root of ZC-sequence, and $n'=(n+m\_ZC)$ mod L_ZC, m=n mod L_c, wherein L_ZC is the length of ZC-sequence, and L_c is the length of cover code c(m).

For the cover code c(m): in one example, c(m)=1 for all m, i.e., no cover code; in another example, c(m) is a Hadamard code. In one sub-example, c(m) is a fixed Hadamard code and does not carry any information in RS-light. E.g., only used for orthogonality purpose. In one sub-example, c(m) can be from a set of Hadamard code with the same length and carries part of the information in RS-light.

In yet another example, c(m) is based on a M-sequence. If cover code carries information in RS-light, cyclic shift to the M-sequence, m_c, can be utilized to indicate the information in RS-light.

In yet another example, c(m) is based on a Gold-sequence. If cover code carries information in RS-light, cyclic shifts to one or both of the M-sequences generating the Gold-sequence, m_c1 and/or m_c2, can be utilized to indicate the information in RS-light.

Regarding the information carried in RS-light: in one sub-example, the root u, and/or the phase shift $\theta$ of ZC-sequence is utilized for generating RS-light and carrying information in RS-light, and the cyclic shift m_ZC of ZC-sequence is fixed as 0 (i.e., no cyclic shift); and in another sub-example, the root u, and/or the cyclic shift m_ZC of ZC-sequence is utilized for generating RS-light and carrying information in RS-light, and the phase shift $\theta$ of ZC-sequence is fixed as 0 (i.e., no phase shift).

In one embodiment, a sequence generation of d_light(n), d_light(n) can be constructed from an PN-sequence. The PN sequence is constructed by XOR of two M-sequences, wherein one M-sequence $s_A$ is given by generator polynomial as $g_A(x)=x^{31}+x^3+1$ with initial condition $c_A$ fixed (e.g., $c_A=1$), and the other M-sequence $s_B(n)$ is given by generator polynomial as $g_B(x)=x^{31}+x^3+x^2+x+1$ with initial condition $c_B$, wherein $c_B$ carries the information in RS-light.

In one example, d_light(n) is constructed by BPSK modulated PN sequence, according to $d\_light(n)=1-2*((s_A(n+Nc)+s_B(n+Nc)) \mod 2)$, where Nc is a fixed shift offset (e.g., Nc=1600), and $0 \leq n < L\_RS$. In another example, d_light(n) is constructed by QPSK modulated PN sequence, according to $d\_light(n)=(1-2*((s_A(2n+Nc)+s_B(2n+Nc)) \mod 2))/\sqrt{2}+j*(1-2*((s_A(2n+Nc+1)+S_B(2n+Nc+1)) \mod 2))/\sqrt{2}$ where Nc is a fixed shift offset (e.g., Nc=1600), and $0 \leq n < L\_RS$.

For the length of PN-sequence based d_light(n), in one example, L_RS=240.

In one embodiment, modified NR Rel-15 SS/PBCH block (SSB) which is transmitted from a serving gNB to at least NR-light UEs is provided. The SS/PBCH block is referred as SSB-light in this disclosure. An SSB-light consists of PSS, SSS, and PBCH similar as NR Rel-15 SS/PBCH block, wherein at least PSS in SSB-light is modified relative to NR Rel-15 PSS, so that SSB-light is transparent to legacy UEs monitoring NR Rel-15 SS/PBCH blocks.

Similarly, as NR Rel-15 SSB, SSB-light can be transmitted in a burst manner, such that a UE assumes there are a burst of maximum of L possible SSBs-light within a time unit of N ms. N and L can be predefined in the specification of the system operation. For example, N=5, L=4 or 8 for SCS of 15 KHz or 30 KHz, L=64 for SCS of 120 KHz or 240 KHz.

Figure 27:
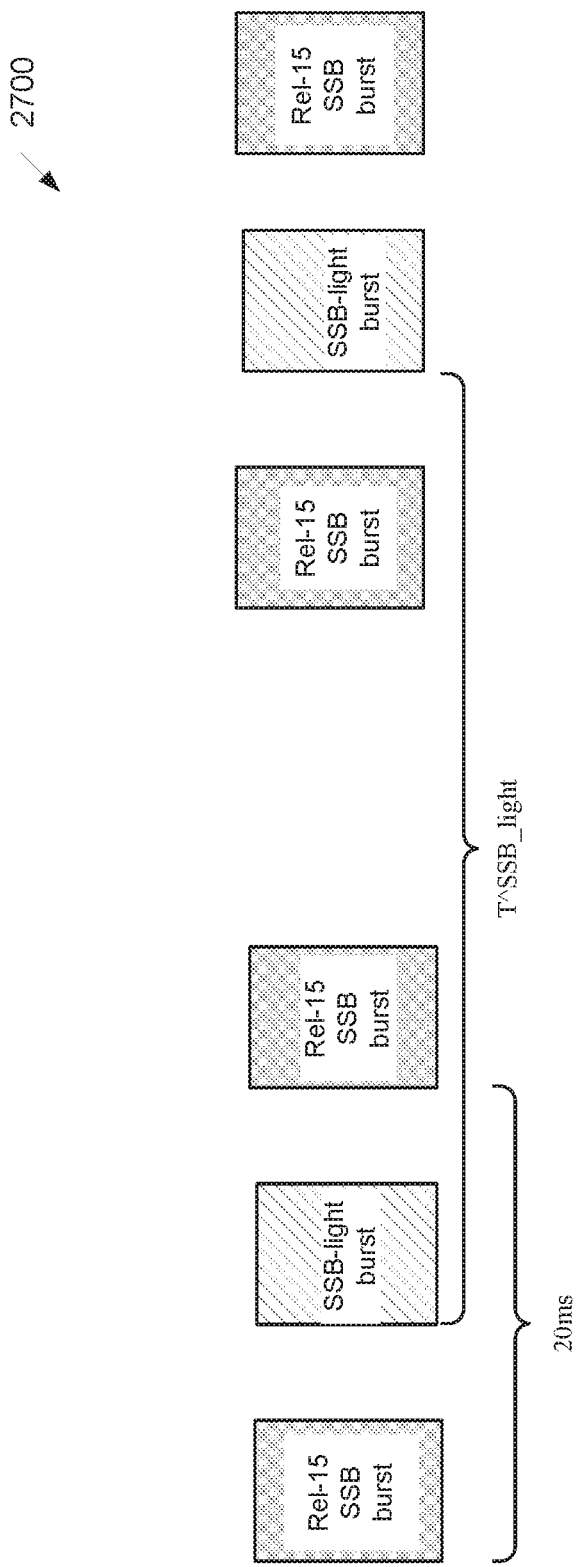
FIG. 27 illustrates an example multiplexing of NR SSB burst and SSB-light burst according to embodiments of the present disclosure.

FIG. 27 illustrates an example multiplexing of NR SSB burst and SSB-light burst 2700 according to embodiments of the present disclosure. An embodiment of the multiplexing of NR SSB burst and SSB-light burst 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions. Other embodiments are used without departing from the scope of the present disclosure.

The periodicity of SSB-light burst T^SSB_light, can be any value in the range of T0_min to T0_max. For example, T0_min=5 ms and T0_max=160 ms. The default value a UE assumes during initial access can be 20 ms or larger than 20 ms, for example, 40 ms.

Let d'_PSS(n) and d'_SSS(n), $n=0, \ldots, 126$, denote the PSS and SSS in SSB-light, respectively, while d_PSS(n) and d_SSS(n) denote NR Rel-15 PSS and SSS, respectively.

In one embodiment of modification of PSS or SSS, the UE assumes that PSS or SSS in SSB-light is NR Rel-15 PSS or SSS with a scrambling sequence or cover code, c(n), such that $d'\_PSS(n)=d\_PSS(n)*c(m)$, or $d'\_SSS(n)=d\_SSS(n)*c(m)$, $n=0, \ldots, 126$, m=n mod L_c, where L_c is the length of c(n). In one example of c(m), c(m) can be constructed from a QPSK or BPSK modulated M-sequence, e.g., c(m) can be generated according to $c(m)=(1-2*d\_M((2m) \mod L\_M))/\sqrt{2}+j*(1-2*d\_M(2m+1) \mod L\_M))/\sqrt{2}$, if QPSK modulated, or $c(m)=1-2*d\_M((m) \mod L\_M)$, if BPSK modulated, where L_M is the length of M-sequence. Denote the generator of M-sequence as g_M(x), which can be determined based on the sequence length L_M, and with a predefined initial condition.

If L_M=127, c_M(n) can be generated from construction method in Table 1 with proper initial condition e.g., $d_M(0)=d(1)=d_M(2)=d_M(3)=d_M(4)=d_M(5)=0$, $d_M(6)=1$, or $d_M(1)=d_M(2)=d_M(3)=d_M(4)=d_M(5)=d_M(6)=0$, $d_M(0)=1$.

In another example c(m), c(m) can be a ZC sequence, e.g., c(m) can be generated according to $c(m)=\exp(-j*\pi*u*m*(m+1))/L\_ZC)$, $n=0, \ldots, L\_ZC-1$ where u is the root of ZC-sequence, and L_ZC is the length of ZC-sequence. For the root of ZC-sequence, u, u carries cell ID or partial of cell ID, n^cell_ID, for example, $u=c0*\text{floor}(n\text{^cell\_ID}/c1)$ or $u=c2*\mod(n\text{^cell\_ID}, c3)$, where c0, c1, c2, and c3 are constant, e.g., c0=43, c1=336, c2=43, c3=3.

In a yet another example c(m), c(m) is Hadamard code. For example, c(m) can be one or a set of length-128 Hadamard codes (e.g., there are 128 length-128 Hadamard codes and Q of them with index s_q, respectively, are chosen to construct c(m), where c(m) is denoted as c_q(m), and $0 \leq q \leq Q-1$.) When only one Hadamard code is considered, c(m) can be any length-128 Hadamard codes except for the one which consists of all is. For example, c(0:127) can be [1 −1 −1 1 −1 1 1 −1 −1 1 1 −1 1−1 −1 1 1 −1 −1 1 −1 1 1 −1 −1 1 1−1 −1 1 1−1 −1 1 1 −1 −1 1 1 −1 −1 1 1 −1 −1 1 1 −1 1 −1 −1 1 −1 1 1 −1 −1 1 1 −1 −1 −1 1 1−1 −1 1 1−1 1 1 −1 1 1 −1 −1 1 1 −1 −1 1 1 −1 1 −1 −1 1 1 −1 −1 1 1 −1 −1 −1 1 1 −1 −1 1 1 −1 1 1 −1 −1 1 −1 −1 −1 1 1 −1 −1 1 1 −1 −1 −1 1 1 −1 −1 1 −1 1 1 −1 −1 1 1 −1]. When Q>1, q can be used to carry information such as cell ID, n^cell_Id, for example, q=mod(floor(n^cell_id/c0), Q), where c0 is a constant integer, e.g., c0=126, Q=3, {s_q}={33, 65, 97}.

In one embodiment of modification of PSS or SSS, the UE assumes that PSS or SSS in SSB-light is NR Rel-15 PSS or SSS with different RE mapping order. For example, UE assumes PSS or SSS in SSB-light is mapped into assigned resources elements in decreasing order of subcarrier index.

In one embodiment of modification of PSS or SSS, the UE assumes that PSS or SSS in SSB-light is NR Rel-15 PSS or SSS with a cyclic shift, such that $d'\_PSS(n)=d\_PSS(n+n1\_cs)*c(m)$, or $d'\_SSS(n)=d\_SSS(n+n2\_cs)$, $n=0, \ldots, 126$, where n_cs is cyclic shift. For PSS, $0<n1\_cs<43$, for example, n1_cs=21 or 22. For SSS, $119<n2\_cs<127$, for example, n2_cs=120

In one embodiment of modification of PSS or SSS, the UE assumes that PSS or SSS in SSB-light is same as NR Rel-15 PSS or SSS but with different polynomial for generating the M-sequence or Gold-sequence.

In one embodiment, additional PBCH multiplexed with NR Rel-15 SS/PBCH block is provided, which is transmitted from a serving gNB to at least NR-light UEs. For an associated UE, the UE is expected to detect the content of PBCH during the initial access procedure. The content carried in the PBCH may be same as NR Rel-15 or different than NR Rel-15, for example, the additional information dedicated to NR-light UEs can be carried in the content of PBCH. The additional PBCH is referred as PBCH-light in this disclosure. There is one to one mapping between a PBCH-light and a NR Rel-15 SS/PBCH block, and the UE assumes DM-RS antenna port for PBCH-light reception is QCLed with the associated SS/PBCH block.

PBCH-light can be used to carry information that is needed during SS/PBCH reception in initial access for at least NR-light UEs. The information carried by PBCH-light can be at least one of the following.

In one example, the information carried in PBCH-light is a cell ID, such that the signal of PBCH-light is cell-specific.

In another example, the information carried in PBCH-light is a configuration of a CORESET dedicated at least to NR-light UEs, where the UE is expected to at least monitor Type0-PDCCH CSS for DCI formats with CRC scrambled by SI-RNTI in a CSS set associated with the CORESET. This type of information is referred as I_CORESET0.

In yet another example, the information carried in PBCH-light is a configuration of a search space set, wherein NR-light UEs monitor PDCCH in the search space set according to a common search space set for at least DCI format with CRC scrambled by SI-RNTI. In one sub-example, the search space set can be Type0-PDCCH CSS set dedicated to NR-light UEs. This type of information is referred as I_CSS0.

In yet another example, the information carried in PBCH-light is the grant of PDSCH for the transmission of system information dedicated at least to NR-light UEs. This type of information is referred as I_RMSI. The grant of PDSCH includes configuration parameters to indicate the configuration of the PDSCH.

In yet another example, the information carried in PBCH-light can be timing information, denoted as I_t; I_t can be associated with the slot index, n_s, or OFDM symbol index, n_OS. For example, $I\_t=n\_s*14+n\_OS$; I_t can also be the SSB index.

In yet another example, the information carried in PBCH-light can be an indication to indicate whether or not to receive/monitor PDCCH in one or more PDCCH monitoring occasion(s) associated with a paging occasion for DCI format with CRC scrambled by P-RNTI.

In yet another example, the information carried in PBCH-light can be an access baring indication to indicate whether or not NR-light UEs can access the cell.

In one embodiment, when more than one OFDM symbols are available for PBCH-light, PBCH-light can be repeated. For example, when two OFDMs symbols are assigned for PBCH-light, a UE assumes PBCH-light is mapped per OFDM symbol and repeated in the two OFDM symbols.

Figure 28:
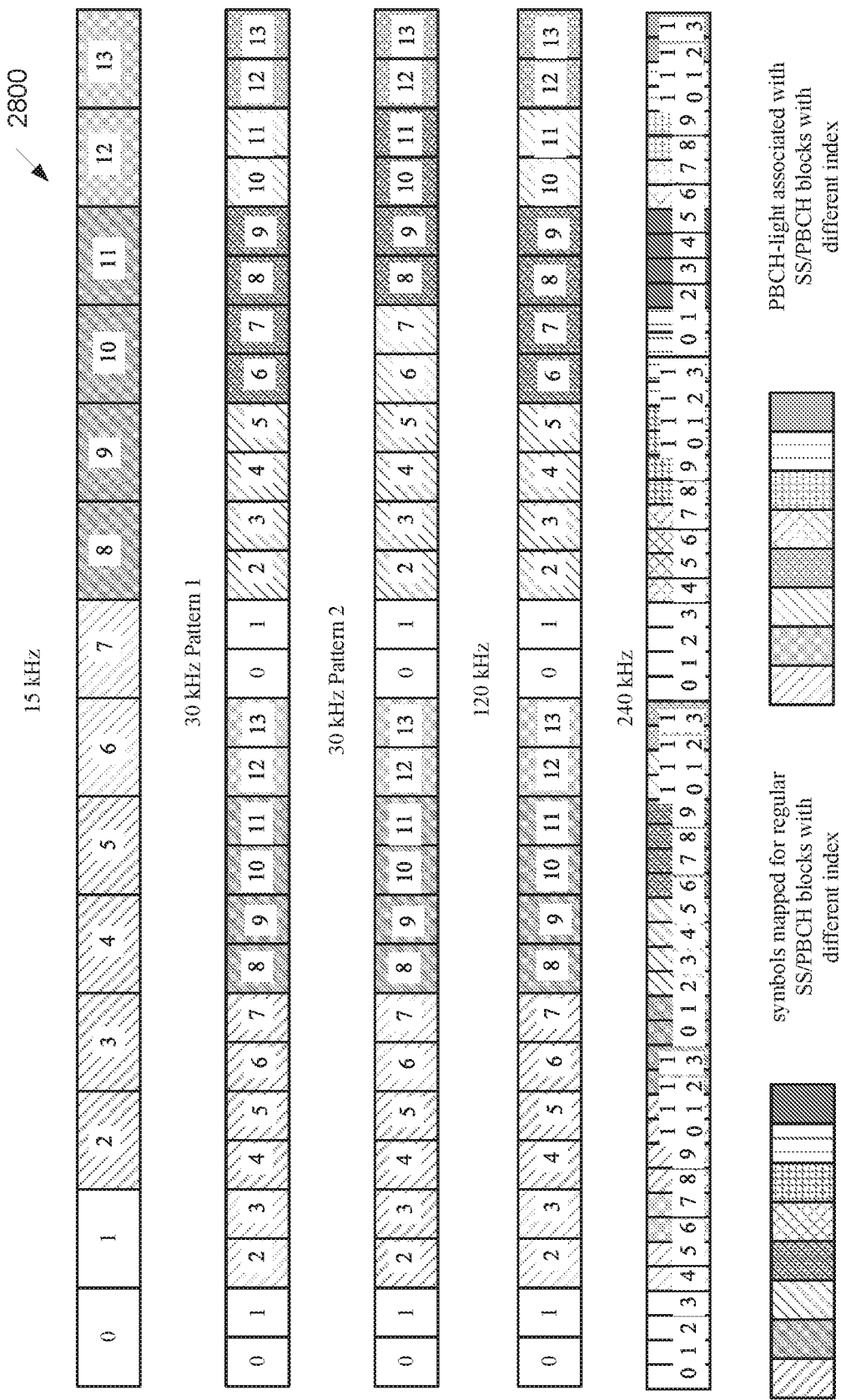
FIG. 28 illustrates an example SS/PBCH block and PBCH-light multiplexing pattern 1 according to embodiments of the present disclosure.

In one example of determination the time/frequency resource for PBCH-light, the PBCH-light can be time division multiplexed (TDMed) with a NR Rel-15 SS/PBCH block. This type of multiplexing pattern is referred as multiplexing pattern 1 in this disclosure. As illustrated in FIG. 28, PBCH-light can be mapped into available OFDM symbols before/after/between NR Rel-15 SS/PBCH blocks. In one sub-example, a last symbol of the PBCH-light is located at a first symbol before the SS/PBCH block. In another sub-example, a last symbol of the PBCH-light is located at a first symbol of the SS/PBCH block, wherein the PBCH-light is mapped into a set resources elements (REs) excluding REs occupied by any SS/PBCH block.

FIG. 28 illustrates an example SS/PBCH block and PBCH-light multiplexing pattern 1 2800 according to embodiments of the present disclosure. An embodiment of the SS/PBCH block and PBCH-light multiplexing pattern 1 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions. Other embodiments are used without departing from the scope of the present disclosure.

For SS/PBCH SCS of 15 KHz, PBCH-light is mapped into the next two consecutive OFDM symbols after the associated SS/PBCH block in the same slot, such that: an OFDM symbol with index 6 and 7 are for PBCH-light associated with a SS/PBCH block in OFDM symbols #2-5 in the same slot; and an OFDM symbol with index 12 and 13 are for PBCH-light associated with a SS/PBCH block in OFDM symbols #8-11 in the same slot.

For SS/PBCH SCS of 30 KHz pattern 1, PBCH-light is mapped into either the two consecutive OFDM symbols before a SS/PBCH block or next two consecutive OFDM symbols after a SS/PBCH block in the same slot, such that: an OFDM symbol with index 2 and 3 are for PBCH-light associated with a SS/PBCH block in OFDM symbols #4-7 in the same slot; an OFDM symbol with index 12 and 13 are for PBCH-light associated with a SS/PBCH block in OFDM symbols #8-11 in the same slot; an OFDM symbol with index 10 and 11 are for PBCH-light associated with a SS/PBCH block in OFDM symbols #2-5 in the same slot; and an OFDM symbol with index 12 and 13 are for PBCH-light associated with a SS/PBCH block in OFDM symbols #6-9 in the same slot.

For SS/PBCH SCS of 30 KHz pattern 2, PBCH-light is mapped into the next two consecutive OFDM symbols after the associated SS/PBCH block in the same slot, such that: an OFDM symbol with index 6 and 7 are for PBCH-light associated with a SS/PBCH block in OFDM symbols #2-5; and an OFDM symbol with index 12 and 13 are for PBCH-light associated with a SS/PBCH block in OFDM symbols #8-11.

For SS/PBCH SCS of 120 KHz, PBCH-light is mapped into either the two consecutive OFDM symbols before a SS/PBCH block or next two consecutive OFDM symbols after a SS/PBCH block in the same slot, such that: an OFDM symbol with index 2 and 3 are for PBCH-light associated with a SS/PBCH block in OFDM symbols #4-7 in the same slot; an OFDM symbol with index 12 and 13 are for PBCH-light associated with a SS/PBCH block in OFDM symbols #8-11 in the same slot; an OFDM symbol with index 10 and 11 are for PBCH-light associated with a SS/PBCH block in OFDM symbols #2-5 in the same slot; and an OFDM symbol with index 12 and 13 are for PBCH-light associated with a SS/PBCH block in OFDM symbols #6-9 in the same slot.

For SS/PBCH SCS of 240 KHz, PBCH-light is mapped into two consecutive OFDM symbols either before or after a SS/PBCH block in the same slot or previous slot or next slot, such that: OFDM symbols with index 4 and 5 are for PDSCH-light associated with a SS/PBCH block in OFDM symbols #8-11 in the same slot; OFDM symbols with index 6 and 7 are for PDSCH-light associated with a SS/PBCH block in OFDM symbols #12-13 in the same slot and #0-1 in next slot; an OFDM symbol with index 10 and 11 are for PBCH-light associated with a SS/PBCH block in OFDM symbols #2-5 in the same slot; an OFDM symbol with index 12 and 13 are for PBCH-light associated with a SS/PBCH block in OFDM symbols #6-9 in the same slot; an OFDM symbol with index 6 and 7 are for PBCH-light associated with a SS/PBCH block in OFDM symbols #4-7 in the previous slot; an OFDM symbol with index 8 and 9 are for PBCH-light associated with a SS/PBCH block in OFDM symbols #8-11 in the previous slot; an OFDM symbol with index 10 and 11 are for PBCH-light associated with SS/PBCH block in OFDM symbols #12-13 in the previous slot and #0-1 in the same slot; and an OFDM symbol with index 12 and 13 are for PBCH-light associated with SS/PBCH block in OFDM symbols #2-5 in the same slot.

For SS/PBCH and PBCH-light multiplexing pattern 1, a UE assumes can determine the BW of PBCH-light in terms of number of RBs (denoted as N^PBCH-light_RB) through any of the following.

In one example, the UE assumes N^PBCH-light_RB is same as the number of RBs of the PBCH in the associated SS/PBCH block.

In another example, the UE assumes N^PBCH-light_RB is same as the number of RBs of CORESET #0 with configuration indicated by the MIB in associated SS/PBCH block.

For SS/PBCH and PBCH-light multiplexing pattern 1, a UE assumes can determine the smallest RB index of PBCH-light RBs (denoted as n_startRB) through any of the following.

In one example, the UE assumes n_startRB is same as the smallest RB of the associated SS/PBCH block.

In another example, the UE assumes that n_startRB is same as the smallest RB of PSS or SSS in the associated SS/PBCH block.

In yet another example, the UE assumes n_startRB is determined by an offset, i.e., O_RB, relative to the smallest RB index of associated SS/PBCH block, i.e., n^SSB_startRB. For example, n_startRB=n^SSB_startRB−O_RB or n_startRB=n^SSB_startRB+O_RB, where O_RB can be a positive or negative integer or zero.

For SS/PBCH and PBCH-light multiplexing pattern 1, a UE is expected to perform rate matching for PDCCH/PDSCH reception when there is overlap on the RE resources with PBCH-light, for example in OFDM symbol with index 2. The UE assumes the REs that are used for PBCH-light are not available for PDCCH/PDSCH RE mapping.

Figure 29:
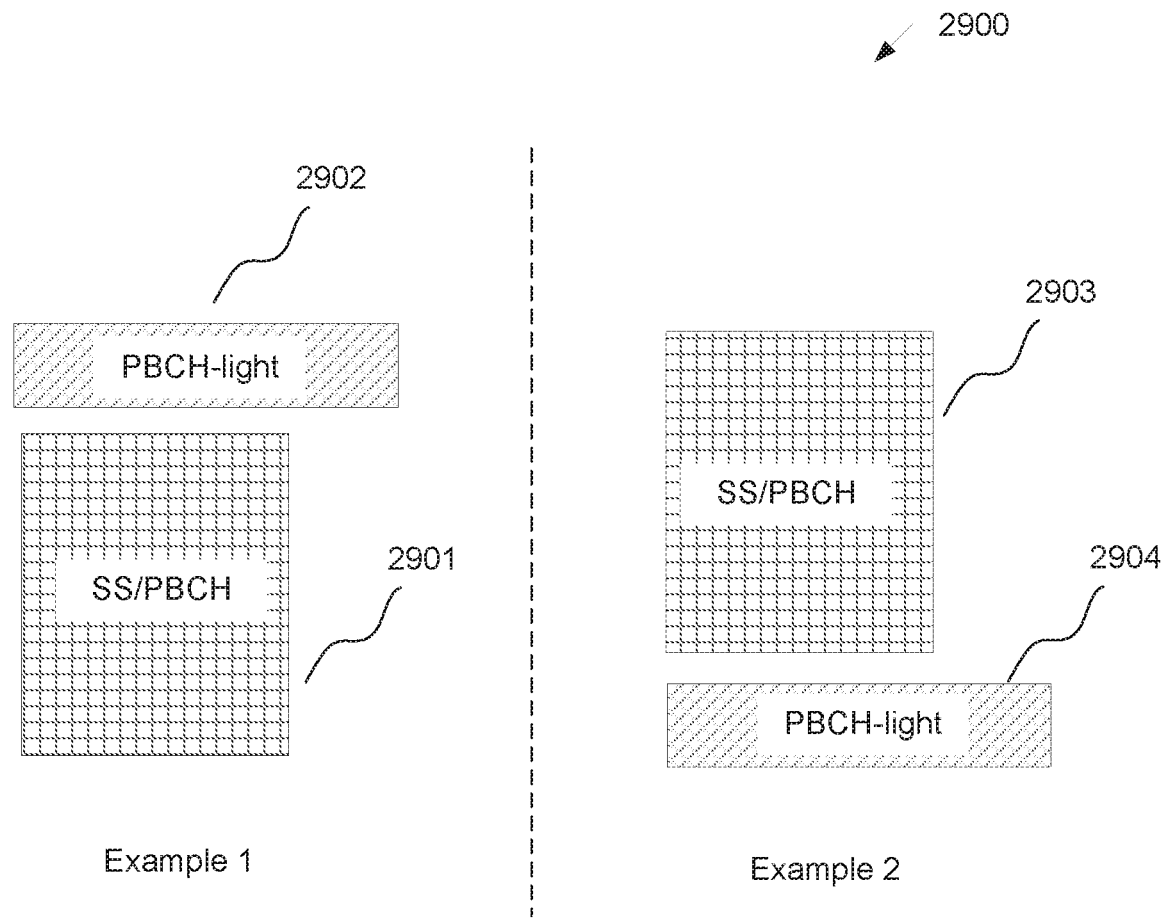
FIG. 29 illustrates an example SS/PBCH block and PBCH-light multiplexing pattern 2 according to embodiments of the present disclosure.

FIG. 29 illustrates an example SS/PBCH block and PBCH-light multiplexing pattern 2 2900 according to embodiments of the present disclosure. An embodiment of the SS/PBCH block and PBCH-light multiplexing pattern 2 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions. Other embodiments are used without departing from the scope of the present disclosure.

In one embodiment of determination time/frequency resource for PBCH-light, the PBCH-light can be multiplexed with NR Rel-15 SS/PBCH block, such that there is no overlapping between RBs for SS/PBCH block and RBs for PBCH-light. This type of multiplexing pattern is referred as multiplexing pattern 2 in this disclosure. As illustrated in FIG. 29, PBCH-light has same start OFDM symbol as associated SS/PBCH block and can be mapped into RE above or below the associated SS/PBCH block. The duration of PBCH-light can be 2 or 3 or 4 or 5 or 6;

For SS/PBCH and PBCH-light multiplexing pattern 2, a UE can determine the BW of PBCH-light in terms of number of RBs (denoted as N^PBCH-light_RB) through any of the following.

In one example, the UE assumes N^PBCH-light_RB is associated with the maximum BW of UE operation BW, i.e., N^UE_RBs, and the BW of SS/PBCH block, i.e., N^SSB_RB. For example, N^PBCH-light_RB=N^UE_RBs−N^SSB_RB+c0, where c0>=0, is a non-negative integer, e.g., c0=0.

In another example, N^PBCH-light_RB can be predefined in the specification, such that N^PBCH-light_RB=1, or 2, or 4 or 8 or 16 or 24 or 48 or 96.

For SS/PBCH and PBCH-light multiplexing pattern 2, a UE can determine the smallest RB index of PBCH-light RBs (denoted as n_startRB) through any of the following.

In one example, the UE assumes n_startRB is determined by an offset, i.e., O_RB, relative to the smallest RB index of associated SS/PBCH block, i.e., n^SSB_startRB. For example, n_startRB=n^SSB_startRB−N^PBCH-light_RB−O_RB, where N^PBCH-light_RB is the BW of PBCH-light, and O_RB can be non-negative integer, e.g., O_RB=0.

In another example, the UE assumes n_startRB is determined by an offset, i.e., O_RB, relative to the largest RB index of associated SS/PBCH block, i.e., n^SSB_endRB. For example, n_startRB=n^SSB_endRB+O_RB, where O_RB can be a positive integer, e.g., O_RB=1.

In one embodiment of determination of time/frequency resource for PBCH-light, the aforementioned embodiment and/or example can be used together to create mapping around SSB (i.e., PBCH-light is both TDMed and FDMed with NR Rel-15 SS/PBCH block).

Figure 30:
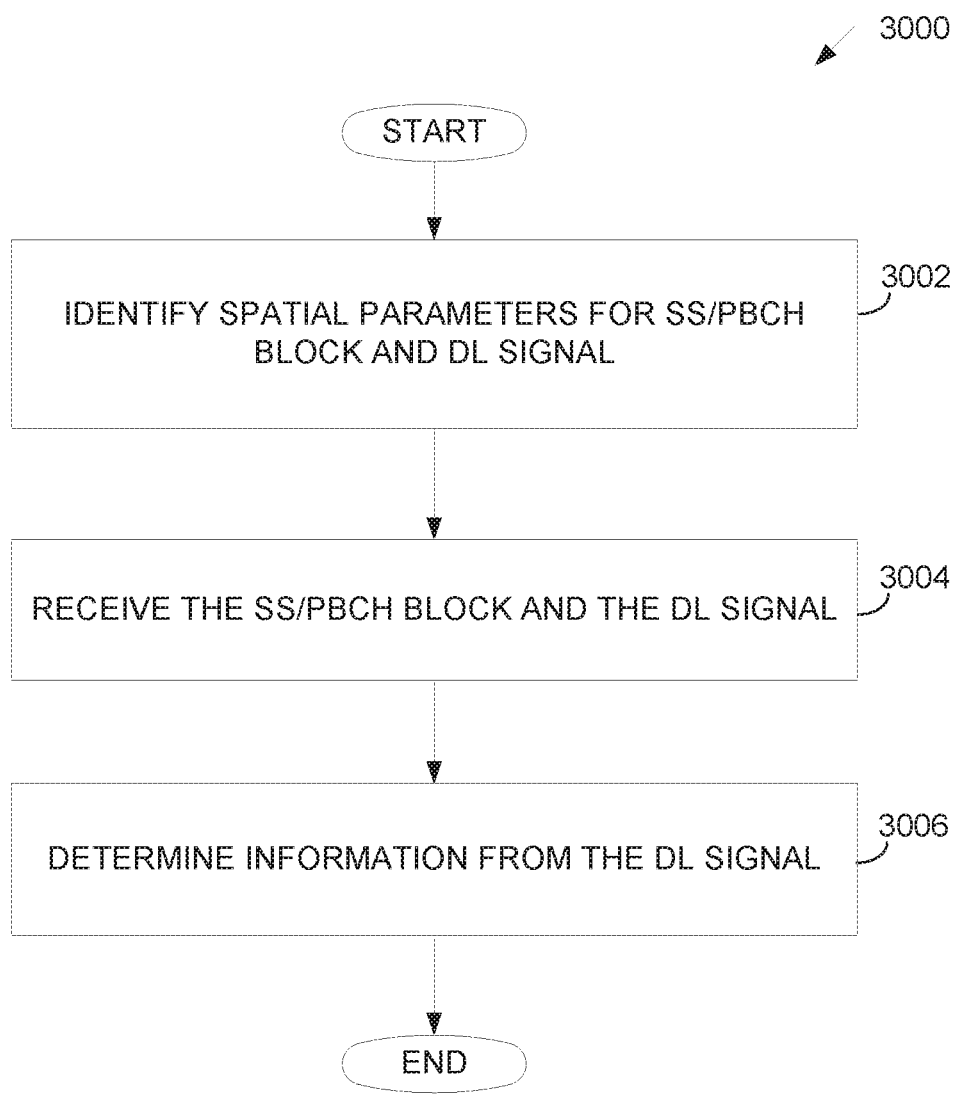
FIG. 30 illustrates a flowchart of a method for SS/PBCH block repetition according to embodiments of the present disclosure.

FIG. 30 illustrates a flow chart of a method 3000 for SS/PBCH block repetition according to embodiments of the present disclosure, as may be performed by a user equipment (UE) (e.g., 111-116 as illustrated in FIG. 1). An embodiment of the method 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 30, the method 3000 begins at step 3002. In step 3002, the UE identifies spatial parameters for a synchronization signals/physical broadcast channel (SS/PBCH) block and a downlink (DL) signal. In such step, the spatial parameters are commonly used for receiving the SS/PBCH block and the DL signal.

Subsequently, in step 3004, the UE receives the SS/PBCH block and the DL signal, wherein the SS/PBCH block and the DL signal are time division multiplexed in a same slot.

Finally, the UE in step 3006 determines information from the DL signal.

In one embodiment, in step 3006, the information includes at least one of an identity of a cell, time information of the DL signal, the time information being a slot index or a symbol index, or a configuration of parameters for receiving a physical downlink shared channel (PDSCH) including system information.

In one embodiment, a PBCH of the SS/PBCH block includes a master information block (MIB) for a first type of UEs or a second type of UEs and the DL signal is a second PBCH that provides another MIB for the second type of UEs.

In one embodiment, the UE identifies the information including configuration information for a control resource set (CORESET) and receives a physical downlink control channel (PDCCH) in the CORESET. In such embodiment, the PDCCH includes a downlink control information (DCI) format with a cyclic redundancy check (CRC) scrambled by a system information radio network temporary identifier (SI-RNTI).

In one embodiment, the UE identifies the information including configuration information for a search space set and receive a PDCCH in the search space set according to a common search space. In such embodiment, the PDCCH includes a DCI format with a CRC scrambled by a system information radio network temporary identifier (SI-RNTI).

In one embodiment, the UE determines the information based on a property of the sequence. In such embodiment, the DL signal is a sequence.

In one embodiment, the UTE determines an indication for receiving a PDCCH based on one of the information carried in the DL signal or an absence or a presence of the DL signal. In such embodiment, the UE further receives, based on the indication, the PDCCH including a DCI format with a CRC scrambled by a paging radio network temporary identifier (P-RNTI), the PDCCH being received with the spatial parameters.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a processor configured to identify spatial parameters for a synchronization signals/physical broadcast channel (SS/PBCH) block and a downlink (DL) signal, wherein the spatial parameters are for receiving the SS/PBCH block and the DL signal; and
a transceiver operably connected to the processor, the transceiver configured to receive the SS/PBCH block and the DL signal that are time division multiplexed in a same slot,
wherein:
the DL signal is a different signal exclusive from the SS/PBCH block;
a PBCH of the SS/PBCH block includes first information for a first type of UEs or a second type of UEs;
the DL signal is dedicated for the second type of UEs; and
the processor is further configured to determine second information from the DL signal.

2. The UE of claim 1, wherein:
the processor is further configured to identify the second information including configuration information for a control resource set (CORESET);
the transceiver is further configured to receive a physical downlink control channel (PDCCH) in the CORESET; and
the PDCCH includes a downlink control information (DCI) format with a cyclic redundancy check (CRC) scrambled by a system information radio network temporary identifier (SI-RNTI).

3. The UE of claim 1, wherein:
the processor is further configured to identify the second information including configuration information for a search space set;
the transceiver is further configured to receive a PDCCH in the search space set according to a common search space; and
the PDCCH includes a DCI format with a CRC scrambled by a system information radio network temporary identifier (SI-RNTI).

4. The UE of claim 1, wherein the second information includes at least one of:
an identity of a cell;
time information of the DL signal, the time information being a slot index or a symbol index; or
a configuration of parameters for receiving a physical downlink shared channel (PDSCH) including system information.

5. The UE of claim 1, wherein:
the DL signal is a sequence; and
the processor is further configured to determine the second information based on a property of the sequence.

6. The UE of claim 1, wherein:
the processor is further configured to determine an indication for receiving a PDCCH based on one of:
the second information carried in the DL signal, or
an absence or a presence of the DL signal; and
the transceiver is further configured to receive, based on the indication, the PDCCH including a DCI format with a CRC scrambled by a paging radio network temporary identifier (P-RNTI), the PDCCH being received with the spatial parameters.

7. The UE of claim 1, wherein:
a PBCH of the SS/PBCH block includes a master information block (MIB) for a first type of UEs or a second type of UEs; and
the DL signal is a second PBCH that provides another MIB for the second type of UEs.

8. A base station (BS) comprising:
a processor configured to identify spatial parameters for a synchronization signals/physical broadcast channel (SS/PBCH) block and a downlink (DL) signal, wherein the spatial parameters are for transmitting the SS/PBCH block and the DL signal; and
a transceiver operably connected to the processor, the transceiver configured to transmit the SS/PBCH block and the DL signal that are time division multiplexed in a same slot,
wherein:
the DL signal is a different signal exclusive from the SS/PBCH block;

a PBCH of the SS/PBCH block includes first information for a first type of UEs or a second type of UEs;
the DL signal is dedicated for the second type of UEs; and
the DL signal includes second information.

9. The BS of claim 8, wherein:
the processor is further configured to include configuration information in the second information for a control resource set (CORESET);
the transceiver is further configured to transmit a physical downlink control channel (PDCCH) in the CORESET; and
the PDCCH includes a downlink control information (DCI) format with a cyclic redundancy check (CRC) scrambled by a system information radio network temporary identifier (SI-RNTI).

10. The BS of claim 8, wherein:
the processor is further configured to include configuration information in the second information for a search space set;
the transceiver is further configured to transmit a PDCCH in the search space set according to a common search space; and
the PDCCH includes a DCI format with a CRC scrambled by a system information radio network temporary identifier (SI-RNTI).

11. The BS of claim 8, wherein the second information includes at least one of:
an identity of a cell;
time information of the DL signal, the time information being a slot index or a symbol index; or
a configuration of parameters for receiving a physical downlink shared channel (PDSCH) including system information.

12. The BS of claim 8, wherein:
the DL signal is a sequence; and
the processor is further configured to include the second information based on a property of the sequence.

13. The BS of claim 8, wherein:
the processor is further configured to generate an indication for transmitting a PDCCH based on one of:
the second information carried in the DL signal, or
an absence or a presence of the DL signal; and
the transceiver is further configured to transmit, based on the indication, the PDCCH including a DCI format with a CRC scrambled by a paging radio network temporary identifier (P-RNTI), the PDCCH being received with the spatial parameters.

14. The BS of claim 8, wherein:
a PBCH of the SS/PBCH block includes a master information block (MIB) for a first type of UEs or a second type of UEs; and
the DL signal is a second PBCH that provides another MIB for the second type of UEs.

15. A method of a user equipment (UE), the method comprising:
identifying spatial parameters for a synchronization signals/physical broadcast channel (SS/PBCH) block and a downlink (DL) signal, wherein the spatial parameters are for receiving the SS/PBCH block and the DL signal;
receiving the SS/PBCH block and the DL signal that are time division multiplexed in a same slot; and
determining second information from the DL signal, wherein:
the DL signal is a different signal exclusive from the SS/PBCH block
a PBCH of the SS/PBCH block includes first information for a first type of UEs or a second type of UEs; and
the DL signal is dedicated for the second type of UEs.

16. The method of claim 15, further comprising:
identifying the second information including configuration information for a control resource set (CORESET); and
receiving a physical downlink control channel (PDCCH) in the CORESET,
wherein the PDCCH includes a downlink control information (DCI) format with a cyclic redundancy check (CRC) scrambled by a system information radio network temporary identifier (SI-RNTI).

17. The method of claim 15, further comprising:
identifying the second information including configuration information for a search space set; and
receiving a PDCCH in the search space set according to a common search space,
wherein the PDCCH includes a DCI format with a CRC scrambled by a system information radio network temporary identifier (SI-RNTI).

18. The method of claim 15, wherein the second information includes at least one of:
an identity of a cell;
time information of the DL signal, the time information being a slot index or a symbol index; or
a configuration of parameters for receiving a physical downlink shared channel (PDSCH) including system information.

19. The method of claim 15, wherein:
the DL signal is a sequence;
a PBCH of the SS/PBCH block includes a master information block (MIB) for a first type of UEs or a second type of UEs; and
the DL signal is a second PBCH that provides another MIB for the second type of UEs.

20. The method of claim 15, further comprising:
determining an indication for receiving a PDCCH based on one of:
the second information carried in the DL signal, or
an absence or a presence of the DL signal;
receiving, based on the indication, the PDCCH including a DCI format with a CRC scrambled by a paging radio network temporary identifier (P-RNTI), the PDCCH being received with the spatial parameters; and
determining the second information based on a property of a sequence of the DL signal.

* * * * *